(12) United States Patent
Gleichmann et al.

(10) Patent No.: US 12,172,162 B2
(45) Date of Patent: Dec. 24, 2024

(54) PRE-SHAPING FLUIDIC SAMPLE IN A PLANAR WAY BEFORE PROCESSING

(71) Applicant: Agilent Technologies, Inc., Santa Clara, CA (US)

(72) Inventors: Tobias Gleichmann, Waldbronn (DE); Stefan Falk-Jordan, Karlsruhe (DE); Reid A. Brennen, San Francisco, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 671 days.

(21) Appl. No.: 17/429,184

(22) PCT Filed: Feb. 10, 2020

(86) PCT No.: PCT/US2020/017563
§ 371 (c)(1),
(2) Date: Aug. 6, 2021

(87) PCT Pub. No.: WO2020/167698
PCT Pub. Date: Aug. 20, 2020

(65) Prior Publication Data
US 2022/0080410 A1    Mar. 17, 2022

Related U.S. Application Data

(60) Provisional application No. 62/803,913, filed on Feb. 11, 2019.

(51) Int. Cl.
*G01N 27/447* (2006.01)
*B01L 3/00* (2006.01)
(Continued)

(52) U.S. Cl.
CPC ........ *B01L 3/50273* (2013.01); *G01N 1/2813* (2013.01); *G01N 27/44743* (2013.01);
(Continued)

(58) Field of Classification Search
CPC ................. G01N 27/44743; G01N 27/453
See application file for complete search history.

(56) References Cited

U.S. PATENT DOCUMENTS 4,861,448 A    8/1989    Cantor et al.
5,074,981 A    12/1991   Fairfield
(Continued)

FOREIGN PATENT DOCUMENTS

EP    1338893 A2    8/2003
EP    1577012 B1    11/2014
(Continued)

OTHER PUBLICATIONS

Chinese office action and search report dated Aug. 19, 2023 for application No. 202080009056.7; 8 pages.
(Continued)

*Primary Examiner* — Herbert K Roberts

(57) ABSTRACT

A method of handling a fluidic sample includes taking fluidic sample from a sample source by a sample shaping tool so that a pre-shaped planar fluidic sample is held by the sample shaping tool with at least one main surface, or both opposing main surfaces, of the pre-shaped planar fluidic sample being exposed, and processing the pre-shaped planar fluidic sample such as by separating the pre-shaped planar fluidic sample in a sample separation device.

20 Claims, 6 Drawing Sheets

(51) Int. Cl.
  *G01N 1/28* (2006.01)
  *G01N 30/06* (2006.01)
(52) U.S. Cl.
  CPC ...... *G01N 30/06* (2013.01); *B01L 2200/0605* (2013.01); *B01L 2300/0645* (2013.01); *B01L 2400/0421* (2013.01); *G01N 2001/2826* (2013.01)

(56) References Cited

U.S. PATENT DOCUMENTS

| | | | |
|---|---|---|---|
| 5,405,516 | A | 4/1995 | Bellon |
| 5,464,515 | A | 11/1995 | Bellon |
| 5,972,188 | A * | 10/1999 | Rice ................. G01N 27/44743 204/616 |
| 8,277,761 | B2 | 10/2012 | Falk-Jordan et al. |
| 11,209,389 | B2 | 12/2021 | Gutzweiler |
| 2003/0116437 | A1 | 6/2003 | Burns et al. |
| 2008/0264793 | A1* | 10/2008 | Vigh .......................... C08F 8/00 252/500 |
| 2009/0053689 | A1 | 2/2009 | Oviso et al. |
| 2010/0282610 | A1 | 11/2010 | Glad et al. |
| 2011/0114485 | A1* | 5/2011 | Sakairi ............ G01N 27/44773 204/600 |
| 2013/0043150 | A1 | 2/2013 | Ohashi |
| 2014/0014515 | A1 | 1/2014 | Santiago et al. |
| 2015/0027889 | A1 | 1/2015 | Pollack et al. |
| 2016/0102341 | A1 | 4/2016 | Curran et al. |
| 2017/0218355 | A1 | 8/2017 | Buie et al. |
| 2018/0106805 | A1 | 4/2018 | Allen et al. |
| 2020/0038867 | A1 | 2/2020 | Baroud et al. |

FOREIGN PATENT DOCUMENTS

| | | |
|---|---|---|
| JP | 3150899 U | 6/2009 |
| WO | 8600708 A1 | 1/1986 |
| WO | 9742496 A1 | 11/1997 |
| WO | 2008014825 A1 | 2/2008 |

OTHER PUBLICATIONS

Gutzweiler, Ludwig, et al., Open Microfluidic Gel Electrophoresis: Rapid And Low Cost Separation And Analysis Of DNA At The Nanoliter Scale; 2017; Electrophoresis, vol. 38; pp. 1764-1770.
PCT Notification of Transmittal of The International Search Report & Written Opinion mailed on May 29, 2020 for Application No. PCT/US2020/017563; 15 pages.
Extended European Search Report issued in EP Application No. 18171820.6 dated Dec. 13, 2018 (eight (8) pages).
Gutzweiler, Ludwig et al. "Large Scale Production and controlled deposition of single HUVEC spheroids for bioprinting applications." Biofabrication, vol. 9, No. 2, Jun. 1, 2017.
Chinese office action and search report dated Jun. 1, 2024 for application No. 202080009056.7; 12 pages.

* cited by examiner

PRE-SHAPING FLUIDIC SAMPLE IN A PLANAR WAY BEFORE PROCESSING

RELATED APPLICATIONS

This application is the national stage under 35 U.S.C. 371 of International Application No. PCT/US2020/017563, filed Feb. 10, 2020; which claims priority to U.S. Provisional Patent App. No. 62/803,913, filed Feb. 11, 2019; the entire contents of each of which are incorporated by reference herein.

BACKGROUND ART

The present invention relates to a method of handling a fluidic sample, to a sample handling device, and to a sample shaping tool.

In liquid chromatography, a fluidic sample and an eluent (liquid mobile phase) may be pumped through conduits and a separation unit such as a column in which separation of sample components takes place. The column may comprise a material which is capable of separating different components of the fluidic sample. The separation unit may be connected to other fluidic members (such as a sampler or an injector, a detector, and other members) by conduits. Before the fluidic sample is introduced into a separation path between a fluid drive unit (in particular a high pressure pump) and the separation unit, a predefined amount of fluidic sample shall be intaken from a sample source (such as a sample container) via an injection needle into a sample loop by a corresponding movement of a piston within a metering device. Thereafter, an injector valve is switched so as to introduce the intaken amount of fluidic sample from the sample loop of a metering path into the separation path between fluid drive unit and the separation unit for subsequent separation.

Another sample separation technique is electrophoresis. Electrophoresis is a method for separation and analysis of a fluidic sample comprising for example macromolecules (such as DNA and proteins) and their fragments, based on their size and charge. Different fractions of a fluidic sample (such as different nucleic acid molecules) are separated by applying an electric field to move the charged molecules through a sieving medium (such as agarose gel or other substances). Smaller molecules move faster and migrate farther than longer ones because smaller molecules migrate more easily through the pores of the sieving medium.

WO 2008/014825 discloses a fluidic device comprising a substrate (for instance a glass substrate) and a transport medium (for instance a gel) provided (for instance printed) on the substrate to define a transport path for transporting a sample (for instance biological molecules to be analyzed) driven by an external source (for example an electric force by applying an electric voltage to electric contact pins to be coupled electrically to the transport medium in an electrophoresis application).

Gutzweiler et al., "Open microfluidic gel electrophoresis: Rapid and low cost separation and analysis of DNA at the nanoliter scale", 2017, Electrophoresis, volume 38, pages 1764 to 1770 discloses conducting on-demand electrophoretic separations of DNA molecules in open microfluidic systems on planar polymer substrates. The open microfluidic separation system comprises two opposing reservoirs with a semi-contact written liquid gel line acting as separation channel interconnecting two liquid reservoirs and sample injected into the line via non-contact droplet dispensing.

However, a sample introduction procedure may involve artifacts of subsequent sample processing. Moreover, the phenomenon of a broadening of a fluidic sample before and during separation may deteriorate separation performance in the above mentioned and other sample separation devices. Similar shortcomings may also arise in other sample processing procedures.

SUMMARY

It is an objective to enable sample processing with high resolution.

According to an exemplary embodiment, a method of handling a fluidic sample is provided, wherein the method comprises taking fluidic sample from a sample source by a sample shaping tool such that a pre-shaped planar fluidic sample is held by the sample shaping tool with at least one main surface (in particular both opposing main surfaces) of the pre-shaped planar fluidic sample being exposed and then processing the pre-shaped planar fluidic sample.

According to another exemplary embodiment, a sample handling device for handling a fluidic sample is provided, wherein the sample handling device comprises a sample shaping tool for taking fluidic sample from a sample source so that a pre-shaped planar fluidic sample is held by the sample shaping tool with at least one main surface (in particular both opposing main surfaces) of the pre-shaped planar fluidic sample being exposed and a sample processing unit for processing the pre-shaped planar fluidic sample when supplied to the sample processing unit.

According to still another exemplary embodiment, a sample shaping tool is provided which comprises a sample accommodation structure configured for accommodating fluidic sample in a predefined shape with at least one main surface (in particular both opposing main surfaces) of the planar fluidic sample being exposed when immersing the sample accommodation structure in fluidic sample from a sample source, wherein a length and a width of the sample accommodation structure are both less than 5 mm, in particular, are both less than 1 mm.

In the context of this application, the term "fluidic sample" may particularly denote any liquid and/or gaseous medium, optionally including also solid particles, which is to be analyzed. Such a fluidic sample may comprise a plurality of fractions of molecules or particles which shall be separated, for instance small mass molecules or large mass biomolecules such as proteins. Separation of a fluidic sample into fractions involves a certain separation criterion (such as electric charge, mass, volume, chemical properties, etc.) according to which a separation is carried out. For instance, such a fluidic sample may be a biological sample which may comprise components to be separated, such as proteins and/or DNA. However, such a fluidic sample may also be subject to another sample processing than sample separation or in addition to sample separation, for instance sample analysis to determine one or more properties of the fluidic sample, or in advance to sample separation, for instance sample concentration or sample denaturation.

In the context of this application, the term "sample processing device" may particularly denote any apparatus which is capable of processing a fluidic sample. Such a processing may in particularly involve separating different fractions of a fluidic sample by applying a certain separation technique, in particular gel electrophoresis or liquid chromatography. Other sample processing applications are sample analysis, sample manipulation sample purification, or sample crystallization. In this context, the term sample analysis may cover each procedure of determining at least one property of the sample, such as a physical property, a chemical property, a biological property, and/or a property in terms of composition of the sample.

In the context of the present application, the term "pre-shaping fluidic sample" may particularly denote bringing fluidic sample held by a sample shaping tool into a predefined shape which is defined by the configuration of the sample shaping tool. In other words, by bringing fluidic sample from a sample source in contact with the sample shaping tool, a certain amount of the fluidic sample will, by physical laws, be held by the sample shaping tool in a specific shape. As long as the sample is held by the sample shaping tool, the sample will substantially maintain its shape.

In the context of the present application, the term "planar fluidic sample" may particularly denote a fluidic sample which is held by a sample shaping tool in such a way that the fluidic sample assumes a shape which lies substantially within one plane. In this context, a person skilled in the art will however understand that a fluidic sample held in the sample shaping tool will in many cases only substantially (but not exactly) assume a planar shape, which may be caused by physical phenomena such as surface adhesion, capillary effects, gravity or the like. However, such a planar fluidic sample may have a substantially homogeneous thickness. An extension of the planar fluidic sample in its thickness direction may be significantly smaller than an extension of the planar fluidic sample in the two orthogonal spatial directions being perpendicular to the thickness direction. For instance, a dimension of the planar fluidic sample in the two spatial directions perpendicular to the thickness direction may be at least 2 times, in particular at least 5 times, of its dimension in its thickness direction. As a consequence, the planar fluidic sample may assume the shape of a liquid film, fluidic thin film, fluidic disc, fluidic sheet or fluidic plate. In particular, such a planar fluidic sample may have two opposing main surfaces (i.e. the two surfaces of the held fluidic sample having the largest surface area). One (see for instance the embodiment of FIG. 17) or preferably both (see for instance the embodiment of FIG. 9) of these main surfaces may be exposed, i.e. may not be covered by the sample shaping tool while being held by the sample shaping tool.

In the context of the present application, the term "sample shaping tool" may particularly denote a user controlled or machine controlled tool which can be handled in such a way that by bringing it in contact with fluidic sample from a sample source, a certain amount of the fluidic sample will be held in a predefined way so as to assume a defined shape which is defined by the configuration of the sample shaping tool.

In the context of the present application, the term "sample source" may particularly denote any physical entity which is capable for providing fluidic sample to the sample shaping tool with the consequence that a certain amount of the fluidic sample will be automatically held by the sample shaping tool in the predefined shape. For example, a sample source may be embodied as a sample container such as a vial, a conduit supplying fluidic sample, or any other physical entity which can be brought in interaction with the sample shaping tool so as to deliver sample to the sample shaping tool to be held in the predefined shape.

According to an exemplary embodiment, a system of delivering an amount of fluidic sample for subsequent further processing (in particular separation in a sample sample separation unit) is provided, in which the fluidic sample is supplied in a predefined well-known planar shape when initiating the sample processing procedure (in particular sample separation procedure). Contrary to conventional approaches, where a sample plug without defined shape is usually supplied for sample separation or other sample processing applications, bringing the fluidic sample to be further processed (in particular separated) in a predefined planar shape prior to further processing (in particular separation) may significantly refine the sample processing procedure (in particular, the sample separation procedure) and may increase resolution (in particular separation performance) of the sample processing (in particular, the sample separation) due to the suppression of artifacts resulting from different shapes of the fluidic sample in different processing (in particular, separation). By taking this measure, conventionally-introduced artifacts (for instance, diffuse injection plugs) in sample processing (in particular, sample separation) may be strongly suppressed. In particular, different sample analysis runs with the same or similar fluidic sample may become properly comparable, since the fluidic sample used for different processing runs can be provided always in the same shape to a sample processing unit. By exposing one or preferably both opposing main surfaces of the planar fluidic sample while holding the latter in a predefined shape by the sample shaping tool, introduction of the planar fluidic sample into a sample processing device as well as further processing of the fluidic sample in the sample processing device may become significantly simplified, since the fluidic sample adhering to the sample shaping tool for instance only along a perimeter can be easily released from the sample shaping tool. Moreover, by simply taking in fluidic sample from any desired sample source by a sample shaping tool is a concept which allows handling the fluidic sample in a user-convenient and strictly defined way, thereby contributing as well to a proper definition of a sample processing (in particular, a sample separation) procedure. Particularly advantageous may be the provision of the fluidic sample in a predefined planar shape with a substantially homogeneous thickness. For instance, in sample separation, the thickness of a fluidic sample body to be separated is one factor which limits the theoretically achievable resolution or separation performance, because it cannot be decided from a separation result whether fractions of the fluidic sample within the thickness extension assume different positions because of different physical properties of the fractions resulting in a spatial separation or because of different starting positions of different molecules in the body of fluidic sample. Moreover, it can be ensured that a substantially constant volume and shape can be obtained each time the sample shaping tool is provided with fluidic sample. When providing a planar fluidic sample, the achievable resolution during sample processing and, in particular, sample separation can be improved.

In the following, further embodiments of the method, the sample handling device and the sample shaping tool will be explained.

In an embodiment, supplying the pre-shaped planar fluidic sample comprises immersing the sample shaping tool with the pre-shaped planar fluidic sample into a carrier medium (such as a sieving medium like a gel, or a mobile phase like a solvent composition) in which the fluidic sample is subsequently separated. According to such an embodiment, after having taken fluidic sample in a predefined shape on the sample shaping tool (for instance, by immersing the sample shaping tool in fluidic sample in a sample container), the sample shaping tool with intaken and properly shaped fluidic sample may be simply immersed in a carrier medium via which the fluidic sample in the predefined shape can be delivered towards a sample separation unit for subsequent separation into fractions. More specifically, it may be sufficient that a portion of the sample shaping tool actually holding the pre-shaped fluidic sample, i.e. the sample accommodation structure, is simply placed into a flow path with carrier medium in which the pre-shaped fluidic sample is carried during sample separation. For instance, in terms of chromatographic sample separation, the carrier medium may be a mobile phase (such as a solvent composition) in which the pre-shaped fluidic sample is delivered to a chromatographic separation column for subsequent separation. In terms of an electrophoresis separation device, the carrier medium may be a gel or an electrolyte buffer in which the sample accommodation structure of the sample shaping tool may be immersed so that, promoted by an electric field, different fractions of the fluidic sample in the predefined shape may propagate with different velocities through the carrier medium so as to be detectable as separate bands. By bringing fluidic sample towards a separation unit by simply immersing the sample shaping tool with fluidic sample of predefined shape into a carrier medium, well defined and properly comparable conditions may be provided for the sample separation procedure. Thus, a sample separation with improved resolution becomes possible.

In an embodiment, the method comprises keeping the sample shaping tool immersed in the carrier medium during separation of the fluidic sample. By maintaining the sample shaping tool in the carrier medium until the separation is completed, completely comparable conditions in different separation runs may be guaranteed. In particular, any artifacts on the sample separation procedure resulting from the removal of the sample shaping tool from the carrier medium may thereby be safely prevented.

In an embodiment, the method comprises at least partially immobilizing the pre-shaped planar fluidic sample by an immobilizing agent inhibiting spatial broadening of the pre-shaped planar fluidic sample after pre-shaping and before separating the fluidic sample. In the context of the present application, the term "immobilizing a fluidic sample" may particularly denote limiting or restricting the freedom of the fluidic sample to freely spatially distribute in any undesired direction. An immobilized fluidic sample may thus be incapable of freely spontaneously moving relative to the immobilized immobilizing agent. Immobilizing the fluidic sample may thus be a process of reducing or inhibiting the mobility of the fluidic sample, up to a complete disabling of any motion of the fluidic sample which may otherwise result in a broadening of the same or in a loss of the predefined shape of the fluidic sample. For example, immobilizing the fluidic sample may be accomplished by converting the fluidic sample and/or a medium carrying or surrounding the fluidic sample into a phase in which no free motion of particles is possible (for instance by gelling or freezing the sample and/or a surrounding thereof into a gel phase or a solid phase). In the context of the present application, the term "immobilizing agent" may particularly denote a medium (in particular a substance or a number of functionally cooperating substances) capable of triggering immobilization of the fluidic sample. Such an immobilizing agent may be a single constituent which changes a phase state of itself and/or of the fluidic sample upon contacting or interacting with the fluidic sample. It is however also possible that the immobilizing agent comprises a first constituent (preferably to be mixed with the fluidic sample) and comprises a second constituent. The second constituent may be configured so that when it comes into contact or interaction with the first constituent, immobilization is triggered. When the fluidic sample is spatially close to the constituents at the time of the interaction, the fluidic sample may be immobilized when the constituents are immobilized. According to such an embodiment, a system is provided in which a fluidic sample may be temporarily prevented from freely moving in a surrounding medium. This temporary immobilization of the fluidic sample may be accomplished by an immobilizing agent located spatially so close to the sample that immobilization of the immobilizing agent also affects the fluidic sample. While in the immobilized state, the immobilizing agent and the fluidic sample may be safely and reliably prevented from spatially broadening or diffusing. An unlimited and pronounced spatial broadening of a fluidic sample may be undesired in terms of sample processing and in particular sample separation because it may reduce the processing (in particular separation) performance. Advantageously, such undesired effects may be efficiently suppressed by exemplary embodiments. For instance, before initiating a sample separation process, it may be desired to carry out preparation processes. In a corresponding waiting phase, the planar fluidic sample held by the sample shaping tool or already introduced into a separation path may be kept temporarily immobilized by the immobilizing agent so that undesired spatial broadening or defocusing of the fluidic sample may be inhibited. After having completed the preparation process and the separation or other processing procedure is started, the sample may be removed or released from the sample shaping tool. In terms of this sample removal procedure, the immobilizing agent may remain immobilized (while the sample may be actively enabled to move through the immobilizing agent) or the immobilizing agent may be disintegrated (so that the motion inhibiting barrier function of the immobilizing agent is lost). The latter can be a time-dependent passive disintegration process (like degradation) or an active disintegration process by applying a force disabling the motion inhibiting function barrier (like electrokinetic forces for instance leading to migration of at least one immobilizing agent constituent) or by changing temperature or exposing the immobilized sample to light of a certain wavelength and intensity. Hence, the planar fluidic sample may be enabled in a controllable way to again freely move and to be separated in accordance with a separation mechanism of the respective sample separation device. By immobilizing the fluidic sample in the predefined planar shape, the fluidic sample may be maintained in this planar shape until a specific separation run or other kinds of processing is started. By pre-shaping and immobilizing the fluidic sample in the planar pre-shape, any undesired broadening due to diffusion or the like may be efficiently suppressed.

In an embodiment, the method comprises subsequently at least partially releasing the pre-shaped planar fluidic sample from the immobilizing agent. In particular, the method may comprise processing (in particular, separating) the fluidic sample after the releasing. By releasing the fluidic sample from the immobilized state, the fluidic sample may be released from immobilization and rendered able to flow during the sample processing (in particular separation) procedure. Thus, very defined starting conditions may be defined when a sample separation procedure or the like starts. This again increases resolution or separation performance of the sample separation procedure.

In an embodiment, the method comprises immobilizing the pre-shaped fluidic sample before or during supplying the fluidic sample to a carrier medium for subsequent separation of the fluidic sample into fractions. Thus, the combination of pre-shaping into a planar shape, immobilization and releasing for separation ensures a proper separation of the fluidic sample with high resolution.

In a preferred embodiment, the method comprises supplying the pre-shaped planar fluidic sample for separation along a separation path so that a normal vector of the main surface (i.e. a vector being oriented perpendicular to the exposed planar surface portions of the planar fluidic sample) of the planar fluidic sample corresponds to a motion direction of the fluidic sample during the separation. In other words, the planar fluidic sample may be inserted into the separation path so that the planar front of fluidic sample moves along the separation path with the smallest thickness direction of the planar fluidic sample corresponding to the motion direction. When the front of the planar fluidic sample in the sample shaping tool is inserted into a separation path so that the entire film is separated substantially simultaneously due to the coincidence of the separation direction with the normal vector with regard to the main surface of the planar film of fluidic sample, a high spatial resolution may be achieved. For instance, in terms of electrophoresis, the separation performance (in particular resolution) is limited by the dimension of the fluidic sample in the direction of the motion during applying the electric field. By pre-shaping the fluidic sample as a planar film moving as a thin sample front along the separation direction, a particularly high spatial resolution of the separation may be achieved.

In an embodiment, the sample processing device (in particular configured as sample separation device) comprises an immobilization unit configured for at least partially immobilizing the pre-shaped planar fluidic sample by an immobilizing agent inhibiting spatial broadening of the pre-shaped planar fluidic sample before or during supplying the pre-shaped planar fluidic sample for further processing (in particular to the sample separation unit), and a release unit for at least partly releasing the fluidic sample from the immobilizing agent. In the context of the present application, the term "immobilizing unit" may particularly denote a member, a kit or a mechanism capable of triggering immobilization of the fluidic sample. By integrating such an immobilizing unit in a sample processing device (in particular in a sample separation device), a corresponding sample processing/separation may be rendered reliable.

In an embodiment, a carrier or separation medium (such as a gel strip) with which the fluidic sample interacts during sample separation is provided with a recess configured for inserting the sample shaping tool with the planar fluidic sample into the recess to thereby bring the fluidic sample in interaction with the separation medium. Such an architecture, which is shown for instance in FIG. 15 and FIG. 16, is simple, reliable, intuitive and compatible with many different gel electrophoresis separation geometries. In particular for screen tape applications as provided by Agilent Technologies and slab gel applications, the formation of such a recess may be advantageous. In particular, DNA ScreenTape analysis, as provided by Agilent Technologies, provides a fast, automated, and flexible DNA electrophoresis solution for sample quality control, for example in next-generation sequencing workflows. The DNA ScreenTape assays are designed to separate DNA fragments and libraries up to 5000 base pairs in 1-2 minutes/sample.

In an embodiment, the sample accommodation structure of the sample shaping tool is configured for accommodating a predefined volume of fluidic sample in predefined shape when immersing the sample accommodation structure in fluidic sample. Thus, by designing the shape of a sample accommodation structure, immersing the latter into fluidic sample will automatically result in a portion of the fluidic sample being held by the sample accommodation structure with a predefined shape. Physical effects such as surface adhesion, surface tension, capillary effects, etc. of fluidic samples may be used advantageously for ensuring that a certain fluidic sample is held by a sample accommodation structure having appropriate shape and made of an appropriate material.

In an embodiment, the sample accommodation structure comprises a loop for holding the fluidic sample. By providing a loop as circumferential support ring with an empty space therein, immersing such a loop in fluidic sample will result, due to properties of fluidic samples such as aqueous solutions, in a portion of the fluidic sample with predefined shape (defined by the geometry of the loop) being held by the sample accommodation structure. By correspondingly adjusting shape and dimension of the loop, the shape of the fluidic sample may be well-defined. Moreover, such a loop has the advantage that a perfectly planar portion of the fluidic sample will be held in a predefined planar shape by the loop. In terms of sample separation, such a geometry of the fluidic sample is particularly advantageous, since it ensures that the entire front of the pre-shaped planar portion of the fluidic sample will propagate along a sample separation path in a spatially strictly confined way. This avoids artifacts due to pronounced profiles of fluidic sample propagating towards the sample separation unit.

In an embodiment, the loop may be a closed loop or an open. The loop may be configured as a round loop (in particular a circular loop) or a polygonal loop (in particular a rectangular or square loop). These and other forms of the loop are possible. Shaping the loop in any of the described ways is very simple and allows manufacturing the sample shaping tool with low effort.

In an embodiment, the sample accommodation structure comprises or consists of a foil, in particular a laser processed foil. When the sample shaping tool is fabricated from a plastic foil (for instance made of polyimide or polyamide) which may be processed in a desired way by laser processing, a simple manufacture of the sample shaping tool can be combined with a proper definition of even very small fluidic sample volumes. As an alternative to a processed foil, a sample shaping tool may be manufactured in a simple way by a corresponding bending of a bendable wire structure or the like.

In an embodiment, the sample shaping tool comprises at least one further sample accommodation structure configured for accommodating further fluidic sample in a predefined planar shape when immersing the at least one further sample accommodation structure in fluidic sample from the sample source. In particular, multi-loop or multi-cavity sample shaping tools may thus be provided. Such an embodiment (compare for instance FIG. 8B) allows intaking multiple fluidic samples and/or processing multiple fluidic samples (in particular, separating multiple fluidic samples) simultaneously and under properly comparable conditions.

In an embodiment, the sample shaping tool comprises a functional structure (for instance, as at least one electrode) in order to functionally influence the fluidic sample accommodated in the sample accommodation structure. When applying a functional structure, preferably comprising one or more electrodes, directly on the sample accommodation body of the sample shaping tool, the fluidic sample held in the sample accommodation volume may be made subject to a manipulation while being held by the sample shaping tool. For instance, the provision of electrodes on the sample shaping tool may allow carrying out a pre-separation or concentration of the fluidic sample in view of a different behaviour of sample fractions in the presence of an electric field already in the sample shaping tool. It is also possible to apply a high frequency field for manipulating or measuring high frequency properties of the fluidic sample (for example, its complex impedance) while being held by the sample shaping tool. A pre-analysis analysis of the unseparated sample may be carried out using electrodes, for example measuring concentration (for instance by impedance) or conductivity of the fluidic sample. Also, an electric field application based immobilization of the fluidic sample held by the sample shaping tool is possible in this way. For instance, applying an electric field may generate an electric force or may trigger a phase change resulting in an immobilization of the fluidic sample. It is also possible to provide cooling and/or heating probes (for instance in form of a Peltier element) as functional structure for cooling or heating the fluidic sample, for example for solidifying or liquefying the fluidic sample temporarily. Furthermore, it is possible to apply a magnetic field generating element as functional structure to apply magnetic fields to the fluidic sample, if desired.

In an embodiment, at least part of the sample accommodation structure comprises or consists of a non-hydrophobic material, in particular comprises or consists of hydrophilic material. By such a non-hydrophobic, in particular hydrophilic material of the loop, proper adhesion between loop and fluidic sample can be ensured while also ensuring that the sample can be easily, and without taking any additional measures, be removed from the sample accommodation structure after having immersed the sample accommodation structure with pre-shaped fluidic sample in a carrier medium for subsequent separation by a sample separation unit. Thus, for aqueous samples a hydrophilic (i.e. not hydrophobic) material may be beneficial. However, in other embodiments in which for instance non-polar samples or even oils are processed or analyzed, a hydrophobic surface or a (in particular slightly) lipophilic surface may be preferred.

In an embodiment, the sample shaping tool comprises a handle piece configured for handling the sample accommodation structure, in particular manually by a user and/or automatically by a tool handling unit. By providing the sample shaping tool with a handle piece, handling of a tiny sample shaping tool even with miniature or microfluidic amounts of fluidic sample becomes a simple task both for a human user or a robot or another machine. The sample shaping tool with loop and, optionally, handle piece may be manufactured with low effort and nevertheless high accuracy in terms of shape and sample volume to be held by the sample shaping tool.

In an embodiment, the sample accommodation structure is a planar structure configured for pre-shaping the fluidic sample with a planar shape when held by the sample accommodation structure. Descriptively speaking, a planar shape enclosed by a planar loop of the sample accommodation structure may translate into a planar shape of the held fluidic sample. The planar pre-shape of the fluidic sample may be defined by a planar pre-shape of the circumference of the sample accommodation structure. As a result of such a geometry, a front of spatially focused fluidic sample may propagate or flow along a separation path of a sample separation device. This ensures properly definable conditions during sample separation and therefore a high resolution of a sample separation run.

In an embodiment, the length of the sample accommodation structure is in a range between 100 µm and 700 µm, in particular in a range between 200 µm and 500 µm, and/or the width of the sample accommodation structure is in a range between 10 µm and 100 µm, in particular in a range between 30 µm and 70 µm. While the exact dimensions of the sample accommodation structure may depend on an actual application, the use of a rectangular sample accommodation structure with significantly different length to width ratio may be highly appropriate for such separation procedures.

In an embodiment relating to the above-described concept of immobilization and subsequent release, it is possible to overcome the barrier of the immobilizing agent actively and/or passively for re-mobilizing the fluidic sample. For instance, overcoming the barrier actively may be carried out by triggering the fluidic sample to migrate through the immobilized phase or immobilizing agent. Passively overcoming the barrier may be accomplished for instance by dissolving the immobilized immobilizing agent or phase due to degradation and/or diffusion. The latter dissolving can be obtained for example by the supply of thermal energy (for instance for melting) or the supply of electrokinetic energy (for instance causing ion migration and consequently dissolution of ionic interactions).

In an embodiment, the method comprises triggering the release by actively applying a release force (in particular by applying an electric release force and/or a centrifugal force) triggering migration (in particular diffusion) of at least part of the fluidic sample out of (in particular, through) the immobilized immobilizing agent. Correspondingly, the device may comprise a release unit for subsequently (i.e. after immobilization) at least partly releasing the fluidic sample from the immobilizing agent. Such a release unit may be configured for generating and applying the above mentioned release force to the immobilized immobilizing agent with the fluidic sample immobilized therein. For instance, the release unit may be configured for releasing the fluidic sample from the immobilizing agent by applying an electric field. Highly advantageously, an electric field generation unit (such as a voltage source) which is already present in an electrophoresis separation device may be used also for releasing the fluidic sample. It has turned out that the application of an electric field to a planar volume or other structure comprising immobilized immobilizing agent as well as (in particular, electrically charged) fluidic sample immobilized therein surprisingly forces the particles of the fluidic sample to selectively move out of and through the matrix of the immobilizing agent into surrounding (in particular, fluidic) medium. Thus, in particular without additional hardware effort, it may be possible in a simple way to re-mobilize the fluidic sample after a temporary immobilization by the mere application of an electric field. Hence, it has turned out that the fluidic sample can be forced to leave the immobilized immobilizing agent by applying an electric field. This is a simple and efficient as well as highly selective way of removing the fluidic sample from the immobilizing agent. Alternatively, the release force may be different from an electric force, for instance may be a magnetic force.

In an embodiment, the method comprises actively triggering the release by at least partly disintegrating the immobilizing agent, in particular, thermally, electrically, and/or chemically. Correspondingly, the device may comprise a disintegration unit which may be configured for triggering an at least partial disintegration of the immobilizing agent after the immobilizing to thereby release the fluidic sample. In the context of the present application, the term "disintegrating" the immobilizing agent may particularly denote a process of intentionally removing, destroying, dissolving, transforming or otherwise manipulating at least part of the immobilizing agent in an immobilizing condition so that the immobilizing agent no longer acts as a motion-preventing barrier for the fluidic sample. For instance, the immobilizing agent may, in one state thereof, form a matrix and/or shell for the fluidic sample preventing spatial broadening or defocusing of the fluidic sample. Upon disintegrating the immobilizing agent from this state, such an inhibition of spatial broadening or defocusing of the fluidic sample may be partially or entirely terminated. This can be accomplished for instance by a phase transition of the immobilizing agent from an immobilizing phase into another phase enabling the fluidic sample to freely or substantially freely move. For instance, an immobilizing agent may be solidified by cooling, for instance using a Peltier element, for immobilization. For releasing or removing the fluidic sample from the immobilizing agent, the latter may be heated so as to become liquid, thereby disintegrating the previously solid immobilizing agent. Thus, it may be possible to thermally trigger disintegration, for example by raising a temperature of the immobilized immobilizing agent above a melting point to thereby render it liquid. It is also possible to add one or more chemical agents, configured for dissolving or liquefying the immobilized immobilizing agent for the sake of disintegration. It may also be possible to weaken or cancel ionic interactions resulting in an immobilization in a reversible way by electrostatic forces. This may be due to the fact that ions may have the tendency of migrating towards a corresponding pole in an electric field (in particular depending on the strength of the electric field).

In an embodiment, the method comprises at least partly releasing the fluidic sample from the immobilizing agent by passively waiting for a spontaneous disintegration of the immobilizing agent. It has turned out that the immobilized immobilizing agent disintegrates on its own terms within a certain time constant, for instance typically within several ten minutes.

In an embodiment, the immobilizing comprises embedding at least part of the fluidic sample in the immobilizing agent and/or enclosing at least part of the fluidic sample by the immobilizing agent. In other words, the immobilizing agent may form a continuous spatial matrix within which the fluidic sample may be accommodated. When the immobilizing agent is then converted into an immovable phase, also motion of the embedded fluidic sample is prevented. However, the immobilizing agent may, additionally or alternatively, form a shell around the planar fluidic sample, wherein the shell may be—in the absence of a release force—impermeable for the fluidic sample (for instance when the shell is solid and usually impermeable). Also such an exterior shell which may be located hermetically closed around the fluidic sample may reliably prevent spatial broadening or other diffusing or defocusing effects of the fluidic sample. The fact whether the immobilizing agent forms a continuous matrix or a hollow shell may depend on the chemical composition of the constituent(s) of the immobilizing agent, the surrounding medium, the properties of the sample, the process control, etc.

In an embodiment, the method comprises triggering an immobilizing phase transition of the immobilizing agent for immobilizing the fluidic sample. In this context, the term "immobilizing phase transition" may particularly denote a phase transition of the immobilizing agent (in particular in combination with the fluidic sample) which activates the immobilized state of the fluidic sample. For instance, the immobilizing agent may be converted from a previously liquid state into a gel or solid state for the mentioned purpose. The phase transition of the immobilizing agent may then result in the immobilization of the fluidic sample.

In an embodiment, the method comprises triggering the immobilizing phase transition of the immobilizing agent into one of the group consisting of a solid phase, a gel phase, and a high viscous phase. In a solid, gel with very small pore sizes or other phase with very high viscosity, the fluidic sample is unable to freely move which equals to a temporary immobilization of the fluidic sample. The immobilizing phase change may be triggered externally, for instance by triggering a chemical reaction, by changing the temperature (in particular by reducing the temperature) and/or the pressure, by changing the pH value, by applying a magnetic field, by exposing the fluidic sample to light of a certain wavelength and intensity etc.

In an embodiment, the method comprises triggering a disintegrating phase change of the immobilizing agent for disintegrating the immobilizing agent. In the context, the term "disintegrating phase change" may particularly denote a phase change of the immobilizing agent by which its function as a matrix or a shell acting as barrier for the fluidic sample is disintegrated, destroyed or removed. In other words, the disintegrating phase change may transform the immobilizing agent and consequently the fluidic sample in interaction therewith from an immobilized state into a movable or flowable state.

In an embodiment, the mentioned disintegration may be promoted or triggered by the addition of one or more release agents. One example for such an embodiment is the use of a substance capable of gelling at an appropriate pH value, wherein this substance may be converted back from the gel phase into another phase (for instance a liquid phase) by supplying an appropriate release agent (such as an acid or a base). In yet another embodiment, it is also possible to supply an additive capable of gelling.

In an embodiment, the method comprises triggering the disintegrating phase transition of the immobilizing agent into one of the group consisting of a liquid phase, a gaseous phase, and a low viscous phase. Thus, the disintegrating phase transition may convert the immobilizing agent into a liquid, a gas or another phase with low viscosity enabling the immobilizing agent itself as well as the fluidic sample therein to again freely move.

In an embodiment, the disintegrating phase change for disintegrating the immobilizing agent is inverse to the immobilizing phase change of the immobilizing agent for immobilizing the fluidic sample. In other words, the immobilizing phase change may convert the immobilizing agent and/or the fluidic sample in interaction therewith from a movable state or phase into an immovable state or phase. The inverse process of transferring the immobilizing agent and/or the fluidic sample therein back to a movable or flowable state by carrying out the disintegrating phase transition will bring back the immobilizing agent and the fluidic sample in the state as it was before carrying out the immobilizing phase transition. Thus, the process of immobilizing may be reversible, once or multiple times.

In an embodiment, at least partly immobilizing the fluidic sample is carried out before and/or after separating the fluidic sample. When immobilizing the fluidic sample prior to separation, it is for instance possible to bridge a waiting time until sample separation starts without the risk of spatial broadening of the fluidic sample due to diffusion or the like. However, it is also possible to immobilize the fluidic sample or selectively a fraction or portion thereof after completion of a separation procedure or part thereof. When a fraction of the fluidic sample has been separated from the rest of the fluidic sample, immobilization of only this fraction keeps the corresponding sample portion together, by the immobilized immobilizing agent. This can be advantageous in terms of fractioning, for example. It is also possible to temporarily immobilize an already separated fluidic sample for potential further analysis to be carried out after separation of the individual constituents or fractions. Further analysis may also be separation in a second dimension as in 2D gel electrophoresis after transferring the re-immobilized sample or sample fraction to a separating path of another sieving medium different in composition for instance. Also waiting times during detection will not result in an undesired spatial broadening of the separated fluidic sample in such an event. Re-immobilized separated sample fractions can also be tested in comparison with a further injected fluidic sample. Also in terms of Western blotting, this may be advantageous.

In an embodiment, the method comprises forming a planar body (such as a sheet-like body) composed of the fluidic sample and the immobilizing agent for immobilizing the fluidic sample.

In an embodiment, the method comprises shielding the immobilized fluidic sample with regard to a (for instance fluidic, in particular liquid and/or gaseous, or gel-like) medium in an environment of the immobilizing agent during maintaining the fluidic sample immobilized. The surrounding medium may for instance be a gel matrix in the example of gel electrophoresis or may be a liquid mobile phase (such as a solvent or solvent composition) in the example of liquid chromatography. While the fluidic sample may be normally able to move within such a medium, the immobilization caused by the immobilizing agent prevents this free motion temporarily, until the immobilizing agent is later disintegrated or removal of the fluidic sample from the immobilizing agent is enabled otherwise (for instance, is enabled by an electric force).

In an embodiment, the method comprises contacting the fluidic sample with the mentioned medium by releasing the fluidic sample from the immobilizing agent. Hence, the process of disintegrating the immobilizing agent or enabling the fluidic sample to traverse the immobilized immobilizing agent may trigger a physical contact of the fluidic sample with the medium and may hence activate the capability of the fluidic sample to move within the fluidic or gel-like medium (for instance for separating different fractions of the fluidic sample).

In an embodiment, the fluidic sample is a biological sample. Such a biological sample may be particularly sensitive and prone to spatial broadening during a waiting phase, for instance needed for preparing an analysis of the fluidic sample in the sample separation device. For example, a biological sample may comprise proteins and/or DNA which may be separated. Examples for such a biological sample are a blood sample, orange juice, a biochemical preparation, a metabolite, a body fluid after digestion of a medication, an environmental sample etc.

In an embodiment, the method may comprise—after the immobilizing—preparing a subsequent separation or analysis of the fluidic sample, and—after the preparing and after the releasing—carrying out the separation or analysis of the fluidic sample. After the releasing, removing or disintegrating, the fluidic sample is again able to freely move, in particular in terms of an analysis or a sample separation. Such a separation may for instance be carried out by electrophoresis (in particular gel electrophoresis) or chromatography (in particular liquid chromatography). In gel electrophoresis, it may be desired that a fluidic sample injected into a gel-type separation medium needs to wait (for instance one minute) until the preparation for starting the actual separation process is completed (an example for such a preparation process in terms of gel electrophoresis is the application of an oil film as an evaporation protection layer). During a corresponding waiting time, an immobilization of the fluidic sample may prevent undesired spatial broadening of the fluidic sample due to effects such as strong diffusion or the like. In liquid chromatography, intaken fluidic sample can be temporarily stored in a sample loop or other sample accommodation volume, wherein the fluidic sample may only fill part of the sample accommodation volume. At an appropriate point of time, a fluidic valve may be switched to inject the intaken and temporarily stored fluidic sample from the sample accommodation volume into a flow path between a fluid drive and a sample separation unit. By temporarily immobilizing the fluidic sample in the immobilizing agent while the fluidic sample is in the sample accommodation volume, undesired spatial broadening of the fluidic sample developing in the waiting time until injection may be avoided. Other separation techniques may however be applied as well. Moreover, also other analysis procedures may be carried out, for instance the determination of a concentration of a constituent of the fluidic sample, or the determination of any other property of the fluidic sample.

In an embodiment, the method comprises applying the fluidic sample on a planar carrier, and subsequently applying a separation medium (for instance with a substantially circular segment-like cross-section) on the planar carrier and in interaction with the fluidic sample. Such a concept may be advantageous in terms of an open microfluidic architecture.

In an embodiment, the immobilizing agent comprises or is a porous medium configured for immobilizing the pre-shaped planar fluidic sample. For instance, the porous medium may be a porous solid and/or a porous gel. For example, the porous medium may be capable of immobilizing the fluidic sample by adsorption. Descriptively speaking, a porous solid/gel may be used as an immobilizing agent, for example a frit-like solid. This may also slow down the exit of the sample from the immobilizing agent. Furthermore, this may also allow the sample to be cleaned up using the porous solid as a solid-phase extraction means or may allow the sample to adhere to the porous solid surface during sample uptake. In yet another embodiment, it may be possible to allow an electric field to act within in the porous solid.

In an embodiment, the sample shaping tool comprises or consists of a porous material. Still referring to the previously described embodiment, it is then also possible that immobilization of fluidic sample occurs directly at porous material of the sample shaping tool. In other words, the immobilizing unit may then be integrated in the sample shaping tool. For instance, immobilization may be triggered by the mere insertion of fluidic sample into the sample shaping tool which may result in an at least partial immobilization of the fluidic sample at the porous material.

In an embodiment, the immobilizing agent comprises a first constituent and a second constituent (which may be stored initially separately from the first constituent) being configured so that the immobilizing agent is immobilized by an interaction, in particular by a chemical reaction, between the first constituent and the second constituent. The method may comprise triggering the immobilizing by mixing the fluidic sample with the first constituent, and subsequently injecting the mixture into a medium comprising the second constituent, in particular while the pre-shaped planar fluidic sample is held by the sample shaping tool. In particular, the mentioned mixing between the fluidic sample and the first constituent may be done before or after pre-shaping. When the first constituent is mixed with the fluidic sample prior to injection and hence prior to the immobilizing, it can be ensured that the subsequent addition of the second constituent (which may trigger immobilization) is carried out in a state in which the sample is already in close spatial relationship with the first constituent. It can thus be ensured that triggering immobilization of the immobilizing agent will also significantly reduce movability of the fluidic sample being located within a range of immobilization.

In an embodiment, the medium carrying or containing the second constituent comprises a gel (for instance an electrophoresis gel, in particular on the basis of polyacrylamide) and/or a mobile phase (for instance a chromatographic mobile phase such as a solvent or solvent composition, for instance comprising an organic component like methanol or acetonitrile and an inorganic component such as water). Hence, the medium may be selected in accordance with the separation technology implemented for separating the fluidic sample into fractions.

In an embodiment, it is possible to cover a gel strip used for gel electrophoresis with an oil coating for preventing evaporation of water and thus drying of the gel. When inserting a fluidic sample held by a sample shaping tool into the gel for carrying out gel electrophoresis separation, two constituents for triggering immobilization of the held fluidic sample may be provided in the fluidic sample and in the oil (or in the gel). Immobilization may then be triggered upon introducing the fluidic sample into the gel.

In an embodiment, the first constituent (or the second constituent) is calcium chloride or calcium glucate lactate. However, a salt with another alkaline earth metal than calcium and/or with another halogen than chloride may be used as well. In an embodiment, the second constituent (or the first constituent) is sodium alginate. However, sodium can also be substituted by another alkaline metal, etc. Other combinations of first constituent and second constituent are possible as well. The first constituent and the second constituent should be selected so that only their interaction triggers the immobilization process. They may furthermore be configured so that the immobilization process is reversible, i.e. disintegration of the immobilized immobilizing agent is later possible by an exterior stimulus or by an intrinsic disintegrating behavior with a sufficiently long time constant of the immobilizing agent itself.

In an embodiment, the interaction triggering the immobilizing is an ion exchange between the first constituent and the second constituent. The term "ion exchange" may denote an exchange of ions between the two chemicals in form of the first constituent and the second constituent. More specifically, sodium ions of sodium alginate may be substituted by calcium ions of the calcium chloride. Such anion exchange may trigger the formation of the gel phase of the immobilizing agent in which the fluidic sample may be immobilized.

In an embodiment, the interaction triggering the immobilizing is a hydrogel formation under participation of the first constituent and the second constituent. In the context of the present application, the term "hydrogel" may particularly denote a network of polymer chains that are hydrophilic, for instance a colloidal gel in which water is a dispersion medium. Hydrogels may be highly absorbent (they can contain over 90% water) natural or synthetic polymeric networks. Forming a hydrogel in which the fluidic sample is embedded is one embodiment of the immobilization process preventing spatial broadening of the pre-shaped sample body.

In another embodiment, the first constituent (or the second constituent) is thrombin, and the second constituent (or the first constituent) is fibrinogen. A thrombin-catalyzed conversion of fibrinogen to fibrin can involve three reversible steps, with thrombin being involved in only the first step which is a limited proteolysis to release fibrinopeptides from fibrinogen to produce fibrin monomer. In the second step, fibrin monomers form intermediate polymers through non-covalent interactions. In the third step, the intermediate polymers aggregate to form the fibrin clot. In the described embodiment, the fluidic sample may be immobilized within such a clot. Since the described process is reversible, it is possible to selectively immobilize the fluidic sample in a fibrin film or release the fluidic sample from the fibrin. Hence, the above described process involving sodium alginate and calcium chloride is only an—however preferred—embodiment and example for an immobilization of fluidic sample according to an embodiment. For example, one of thrombin and fibrinogen may be mixed (or premixed) with the fluidic sample, whereas the other one of thrombin and fibrinogen may be mixed (or premixed) with the separation medium (such as gel in the example of gel electrophoresis or a solvent composition in the example of liquid chromatography). Instead of being mixed with a separation medium, the second constituent may also be added to the fluidic sample already comprising the first constituent while the fluidic sample is held in the sample shaping tool so as to be immobilized in the sample shaping tool.

In still another embodiment, the first constituent is a polymerizable substance, and the second constituent is a polymerization-triggering agent, or vice versa. More generally, the immobilization process can be realized by in situ polymerization. For example, it is possible to add a polymerizable substance to the separation medium which substance polymerizes upon contact with the polymerization-triggering agent (which may be mixed with the fluidic sample) and thus fixes or immobilizes the fluidic sample. In yet another embodiment, it is possible to trigger such a polymerization of a polymerizable immobilizing agent by another stimulus mechanism, such as the supply of ultraviolet radiation, thermal energy, chemical agents, etc. Polymerization may also be triggered only locally.

However, it should be said that exemplary embodiments may use multiple mechanisms for immobilizing an immobilizing agent and fluidic sample in interaction with such an immobilizing agent or part thereof.

The following Table gives an overview of some immobilizing agents and constituents thereof which may be used according to different exemplary embodiments

| Name | Constituent(s) | Mechanism | Description |
| --- | --- | --- | --- |
| Alginate | Calcium chloride and sodium alginate | Ionic formation of hydrogel | Addition of calcium chloride to the fluidic sample and of sodium alginate to a separation medium (or vice versa); ion exchange between sodium and calcium forms a hydrogel |
| Fibrin | fibrinogen and thrombin | Enzymatic formation of hydrogel | Addition of fibrinogen to the fluidic sample and of thrombin to a separation medium (or vice versa) |
| Agarose | agarose | Thermal formation of hydrogel | Addition of agarose to the fluidic sample or to the separation medium; gelling of |

-continued

| Name | Constituent(s) | Mechanism | Description |
|---|---|---|---|
| | | | agarose occurs at temperatures of below 37° C. (in a reversible manner) |
| DMSO | DMSO | Thermal crystallization | 100% DMSO freezes at a temperature below 18° C.; in embodiments with a mixture of water and DMSO, the freezing point is shifted |
| Pluronic | Pluronic F-127 | Thermal formation of hydrogel | Mixture of Pluronic and water is liquid below 10° C. and solid (or a hydrogel) above |
| Gelatine | gelatine | Thermal formation of hydrogel | Addition of gelatine to the fluidic sample or to the separation medium; gelling of gelatine occurs at temperatures of below 37° C. (in a reversible manner) |
| Collagen | collagen and acidic or alkaline solution | pH dependent hydrogel formation | Addition of acidic or alkaline solution to the fluidic sample and collagen to the separation medium (or vice versa); collagen forms a hydrogel in the neutral range and becomes liquid in the alkaline or acidic range |
| Chitin | chitosan and acidic solution | pH dependent hydrogel formation | Addition of acidic solution to the fluidic sample and chitosan to the separation medium (or vice versa); chitosan forms a hydrogel (chitin) in the acidic range and becomes liquid again in the alkaline range |
| Starch | starch | Increase of viscosity | Addition of starch dramatically increases the viscosity and limits diffusion of fluidic sample therein |
| Polyacrylamide | acrylamide and a polymerization-triggering agent and optional a cross-linking agent | Polymerization (for instance chemically or UV-triggered) | Addition of acrylamide to the fluidic sample and of a polymerization-triggering agent to a separation medium (or vice versa); upon contact, the formation of a highly viscous gel or a gel with small pores is triggered; in case of UV treatment, the solution comprising acrylamide and a UV-sensitive polymerization-triggering g agent can be locally illuminated; also a complete illumination is possible, for instance when the UV-sensitive radical-forming agent is only applied locally at a defined position |
| Polymer solution | polymer | Increase of viscosity | Add to fluidic sample |
| TreviGel | TreviGel500 | Thermal formation of hydrogel | Addition of agarose to the fluidic sample or to the separation medium; gelling of agarose occurs at temperatures of around 37° C. (in a reversible manner) |
| Polyvinyl alcohol | Vinyl alcohol | Increase of viscosity | Add to fluidic sample |
| Glycerol | glycerol | Increase of viscosity | Add to fluidic sample |
| Sucrose | sucrose | Increase of viscosity | Add to fluidic sample |
| Ficoll | ficoll | Increase of viscosity | Add to fluidic sample |

In an embodiment, the method comprises providing a separation medium for separating the fluidic sample on a carrier, injecting the pre-shaped planar fluidic sample to the separation medium (in particular thereby triggering the immobilizing), and after the immobilizing and the releasing, separating the fluidic sample by the separation medium (in particular by electrophoresis). For example, such a separation medium may be a gel strip or matrix in the example of gel electrophoresis, in particular applied (for instance printed) on the carrier. In case of liquid chromatography, the separation medium may be a chromatographic separation medium in or on a carrier such as a column tube. When the immobilization of the fluidic sample has been removed, the fluidic sample is again freely movable and therefore separable into different fractions.

In an embodiment, the method comprises only locally immobilizing the fluidic sample by the immobilizing agent while an environment of the fluidic sample and the immobilizing agent remains in an unchanged (for instance fluidic) state. Thus, in such an embodiment, the temporary immobilization substantially only affects the fluidic sample and the immobilizing agent itself while the environment remains unchanged (for instance fluidic) and thus freely movable also during maintaining the state of immobilization. This ensures that the separation device is only affected to a minimum and absolutely necessary degree (i.e. what concerns the fluidic sample) by the immobilization process. According to such an embodiment, the time interval during which the fluidic sample remains immobilized can be used for preparing a subsequent analysis or separation, for completing a previous analysis or separation, etc. Thus, the fluidic sample is prevented during a corresponding waiting time from undesirably spatially broadening or spatially defocusing to thereby avoid an undesired dilution or spatial broadening of the fluidic sample.

However, in other embodiments, an entire system may be immobilized temporarily (rather than only locally immobilizing a small portion thereof).

In an embodiment, the device comprises an electric field generating unit configured for generating an electric field for applying an electric force to the fluidic sample in a medium during and/or after the releasing, in particular for releasing the fluidic sample from the immobilized immobilizing agent and/or for separating and moving the fluidic sample towards a detector for detecting separated fractions of the fluidic sample. The electric field generating unit may serve to trigger release of the fluidic sample from the immobilized immobilizing agent by an electric release force. Moreover, a separation process in terms of gel electrophoresis for separating the released fluidic sample may move different fractions of the fluidic sample differently in an electric field generated by the (preferably the same) electric field generating unit to thereby accomplish separation of the fractions of the fluidic sample.

In an embodiment, the device comprises an injection unit for injecting the at least partly immobilized fluidic sample into a separation channel (for example a separation channel in which the fluidic sample is to be separated or a separation channel for guiding the fluidic sample to a sample separation unit for separation). Prior to, during and/or after such an injecting process, the previously immobilized fluidic sample may be re-mobilized and may therefore be prepared for subsequent separation. It is also possible to form a sequence of immobilized fluidic sample films in a supply channel and to inject the fluidic sample films one after the other into the separation channel for separation into fractions.

In an embodiment, the device comprises a compensation unit configured for—in particular computationally—at least partly compensating a deviation between a separation result in the presence of the immobilizing agent and a separation result in the absence of the immobilizing agent. Highly advantageously, immobilizing agents (for instance a combination of sodium alginate and calcium chloride) are disclosed which have an only very minor impact on the chemical environment of the fluidic sample during the pre-separation immobilization phase. However, in case that an immobilizing agent is implemented in exemplary embodiments which has a significant impact on the separation result, artifacts of the separation results due to the chemical influence of the immobilizing agent may be partially or completely eliminated by compensating or correcting the separation result in view of the mentioned impact. As a basis for such a compensation or correction, it is possible to model the behavior of the fluidic sample in the chemical environment with the immobilizing agent in comparison with its behavior in the absence of the immobilizing agent. Additionally or alternatively, such a compensation may be accomplished by using reference measurements (for instance with and without immobilizing agent) which may be stored for example in a database or lookup table. Also expert knowledge (such as expert rules) may be implemented for this purpose. By taking this measure, the resolution of the separation result may be further improved.

In an embodiment of the sample handling device, the sample processing unit comprises an electromagnetic radiation source configured for irradiating the fluidic sample in the sample accommodation volume with primary electromagnetic radiation and comprises an electromagnetic radiation detector configured for detecting secondary electromagnetic radiation generated by an interaction between the primary electromagnetic radiation and the fluidic sample. By taking this measure, it is for instance possible to carry out an optical measurement on the fluidic sample while being held in its planar predefined shape by the sample shaping tool. For instance, it is possible to measure in transmission geometry, reflection geometry, etc. It is for example possible to measure the absorbance, fluorescence properties, etc.

In an embodiment of the sample handling device, the sample processing unit comprises an ionizing unit configured for irradiating the pre-shaped planar fluidic sample in the sample accommodation volume of the sample shaping tool with electromagnetic radiation (in particular a laser beam) configured for ionizing at least part of the fluidic sample. By this ionization of the sample, it may be rendered appropriate for a subsequent analysis in a mass spectrometer requiring an ionized sample. When ionizing the fluidic sample while being held by the sample shaping tool, it is for instance possible to make the sample accessible to further analysis by a mass spectrometer which may require an ionized sample. The sample may also be ionized while being held by the shaping tool and being immobilized by an appropriate immobilization agent.

In an embodiment of the sample handling device, the sample processing unit comprises a dialysis medium container filled with a dialysis medium and having a dialysis membrane so that the pre-shaped planar fluidic sample in the sample accommodation volume is dialyzed upon bringing the sample shaping tool in interaction with the dialysis medium via the dialysis membrane. With such a dialysis of the fluidic sample in a state being held by the sample shaping tool, it is for instance possible to remove undesired constituents of the fluidic sample before further analysis or further separation. In view of the planar shape, the exchange surface of the fluidic sample with the dialysis medium via the dialysis membrane is high.

In the embodiment, the sample shaping tool may comprise a crystallization buffer container containing a crystallization buffer so that the fluidic sample in the sample accommodation volume is crystallized when bringing the sample shaping tool in interaction with the crystallization medium. For instance, a protein sample may be crystallized to thereby form protein crystals while the pre-shaped planar fluidic sample is held by the sample shaping tool.

In an embodiment, the device comprises a fluid drive configured for driving the fluidic sample in a mobile phase after the releasing towards a sample separation unit, and comprises the sample separation unit which may be configured for separating the fluidic sample. For example, such a fluid drive may be a high pressure pump configured for driving a mobile phase (i.e. a solvent or solvent composition) and the fluidic sample towards a sample separation unit. The sample separation unit may be a chromatographic column. Thus, the described arrangement corresponds to a sample analysis by liquid chromatography.

In an embodiment, the device is a microfluidic device. In the context of the present application, the term "microfluidic device" may particularly denote a device which is capable of analyzing or handling a fluidic sample having channels with a diameter in the order of magnitude of micrometers. Also flow rates may be in a range of microliters per minute. Such microfluidic devices may for instance be liquid chromatography devices or electrophoresis devices which are capable of handling small amounts of a fluidic sample.

Embodiments may be implemented in conventionally available high-performance liquid chromatography (HPLC) systems, such as the Agilent 1200 Series Rapid Resolution LC system or the Agilent 120 HPLC series (both provided by the applicant Agilent Technologies).

One embodiment of a sample separation device comprises a pumping apparatus as fluid drive or mobile phase drive having a pump piston for reciprocation in a pump working chamber to compress liquid in the pump working chamber to a high pressure at which compressibility of the liquid becomes noticeable. This pumping apparatus may be configured to know (by means of operator's input, notification from another module of the instrument or similar) or elsewise derive solvent properties, which may be used to represent or retrieve actual properties of fluidic content, which is anticipated to be in a sampling apparatus.

The separation unit of the fluid separation apparatus preferably comprises a chromatographic column providing the stationary phase. The column may be a glass, ceramic, or steel tube (for instance with a diameter from 50 μm to 5 mm and a length of 1 cm to 1 m) or a microfluidic column (as disclosed for instance in EP 1577012 or the Agilent 1200 Series HPLC-Chip/MS System provided by the applicant Agilent Technologies). The individual components are retained by the stationary phase differently and at least partly separate from each other while they are propagating at different speeds through the column with the eluent. At the end of the column they elute one at a time or at least not entirely simultaneously. During the entire chromatography process the eluent may be also collected in a series of fractions. The stationary phase or adsorbent in column chromatography usually is a solid material. The most common stationary phase for column chromatography is silica gel, surface modified silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface.

The mobile phase (or eluent) can be a pure solvent or a mixture of different solvents (such as water and an organic solvent such as ACN, acetonitrile). It can be chosen for instance to minimize the retention of the compounds of interest and/or the amount of mobile phase to run the chromatography. The mobile phase can also be chosen so that the different compounds or fractions of the fluidic sample can be separated effectively. The mobile phase may comprise an organic solvent like for instance methanol or acetonitrile, often diluted with water. For gradient operation water and organic solvent are delivered in separate bottles, from which the gradient pump delivers a programmed blend to the system. Other commonly used solvents may be methanol, isopropanol, tetrahydrofuran (THF), hexane, ethanol and/or any combination thereof or any combination of these with aforementioned solvents.

The fluidic sample may comprise but is not limited to any type of process liquid, natural sample like juice, body fluids like plasma or it may be the result of a reaction like from a fermentation broth.

The pressure, as generated by the fluid drive in the mobile phase may range from 2-200 MPa (20 to 2000 bar), in particular 10-150 MPa (20 to 1500 bar), and more particularly 50-120 MPa (500 to 1200 bar).

The sample separation device, for instance an HPLC system, may further comprise a detector for detecting separated compounds of the fluidic sample, a fractionating unit for outputting separated compounds of the fluidic sample, or any combination thereof. Further details of such an HPLC system are disclosed with respect to the Agilent 1200 Series Rapid Resolution LC system or the Agilent 120 HPLC series, both provided by the applicant Agilent Technologies.

Embodiments can be partly or entirely embodied or supported by one or more suitable software programs, which can be stored on or otherwise provided by any kind of data carrier or non-transitory medium, and which might be executed in or by any suitable data processing unit, control unit, computer, etc. Software programs or routines can be preferably applied in or by the control unit.

BRIEF DESCRIPTION OF DRAWINGS

Other objects and many of the attendant advantages of embodiments will be readily appreciated and become better understood by reference to the following more detailed description of embodiments in connection with the accompanying drawings. Features that are substantially or functionally equal or similar will be referred to by the same reference signs.

Figure 1:
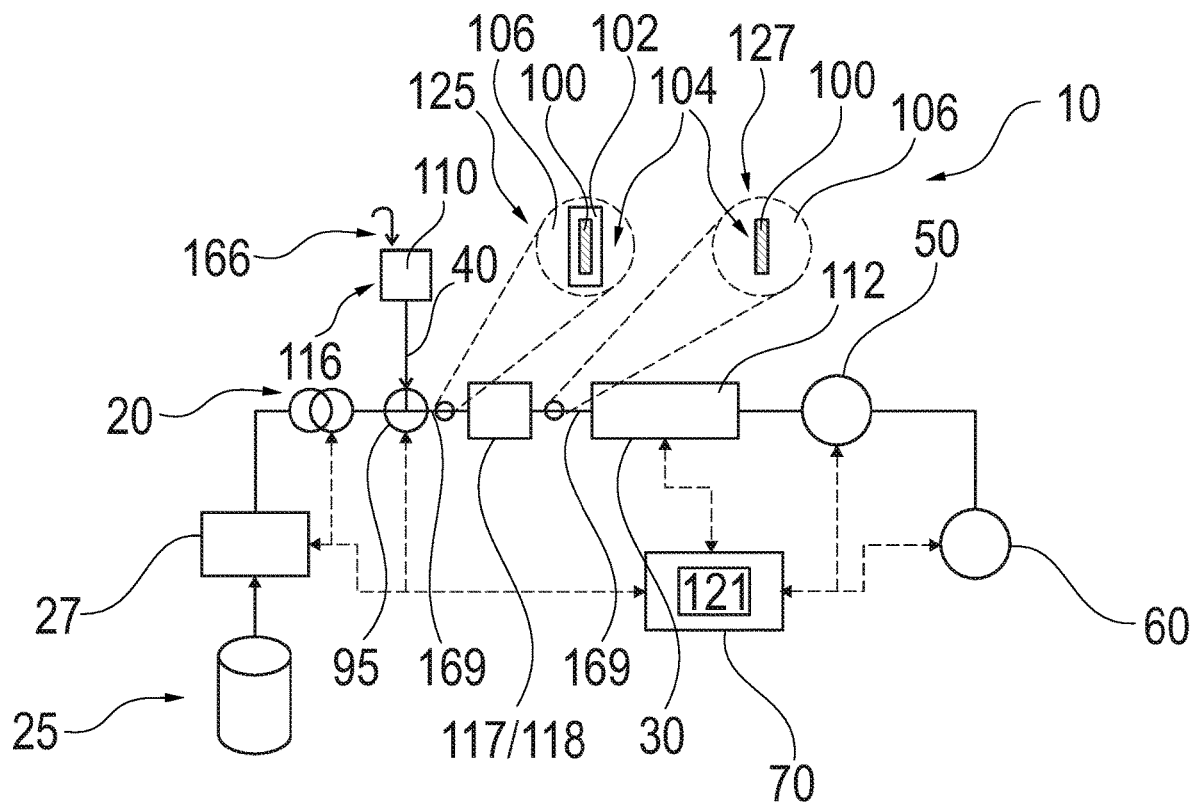
FIG. 1 shows a main portion of a liquid sample separation device in accordance with an embodiment, particularly used in high-performance liquid chromatography (HPLC).

The illustration in the drawing is schematic.

DETAILED DESCRIPTION

Before describing the figures in further detail, some basic considerations will be summarized based on which exemplary embodiments have been developed.

According to an exemplary embodiment, pre-shaping of a (for instance chromatographic or electrophoretic) fluidic sample plug may be accomplished using a sample shaping tool configured for receiving and bringing fluidic sample into a planar shape. For example, the sample shaping tool may be embodied as a loop-like injection pin. For instance, such a concept can be advantageously applied to sample supply in terms of gel electrophoresis with channel free microfluidics (also called open microfluidics).

According to an exemplary embodiment, by immersing a sample shaping tool comprising a flat loop-like structure into a liquid sample and pulling the loop-like structure out right thereafter, the loop-like structure may include a liquid sample film that may fill the entire loop with a thickness corresponding to an inner edge of the loop (descriptively speaking, an edge along which the liquid sample film is in contact with the loop). Advantageously, the loop-like structure may be made of an appropriate material, preferably a slightly hydrophilic material, at least for aqueous samples. Alternatively, the loop-like structure may be partly hydrophobic and partly hydrophilic. Further, the surface of the loop-like structure that will be in contact with the liquid film, i.e. after pulling the loop-like structure out of the liquid sample, is structured in a way to provide a surface of different wetting properties, either more or less hydrophilic, than the bulk material the loop-like structure is made of. It is possible that the loop of the sample shaping tool has any closed or non-closed shape. For instance, the shape of the loop may be the shape of a circle, square, rectangle, half-circle, etc.

More specifically, a properly fabricated micro-loop may be used according to an exemplary embodiment to pick up a thin liquid film (for instance having a thickness of not more than 100 µm, in particular of not more than 50 µm) of a (for instance water-based) sample solution. For example, such a fluidic sample may contain DNA, RNA and/or proteins, i.e. may be a biological sample. For example, the liquid film may have dimensions in a length direction and in a width direction of for instance not more than 1 mm, in particular not more than 500 µm, for instance roughly 300 µm×50 µm. Such a sample film may be taken by the micro-loop of the sample shaping tool from a sample reservoir containing a sample solution.

Preferably, but not necessarily, the sample solution may contain a first constituent (for instance calcium chloride) of an immobilizing agent for preparing a subsequent immobilization of the planar fluidic sample which has already been pre-shaped by the micro-loop. Optionally, the liquid film of the pre-shaped fluidic sample may get immobilized (in particular solidified) for example by any chemical reaction or physical force or property in advance to immersing the pre-shaped fluidic sample in a carrier medium used for sample separation. For example, such an immobilization may be accomplished by (in particular rapid) freezing (for example by cooling down from a temperature higher than the surrounding environment), or gelation (for instance, a gel-forming agent like agarose may be added to the sample solution in advance). Immobilization or gelation respectively may also be accomplished by adding for instance either calcium chloride or alginate to the fluidic sample and then adding the other constituent of the immobilization agent (i.e. calcium chloride or alginate in the present example) for instance by spraying a liquid film. It is also possible to accomplish immobilization by crystallization by evaporation (for instance when a crystallizable agent was added to the sample in advance), etc.

It is then possible, with or without previous immobilization, to immerse the loop carrying the pre-shaped fluidic sample into a carrier medium (such as a chromatographic or electrophoretic separation liquid or gel). Such a carrier medium may for instance be provided inside a tube or applied on a surface in order to fully incorporate the liquid sample film in this liquid. In one embodiment, the carrier medium or separation liquid may be a liquid hydrogel. It is also possible that the carrier medium or separation liquid contains a constituent of an immobilization agent, for example alginate.

Preferably but not necessarily, it is then possible to keep the loop of the sample shaping tool in the second liquid or carrier medium while a sample separation (in particular a chromatographic or electrophoretic application) is running.

The described concept of an exemplary embodiment may enable to actively and/or passively pre-shape an injection plug (i.e. a sample plug) in a planar layer shape, for example for a sample separation application (such as a chromatographic or electrophoretic application). Pre-shaping may be accomplished in some or even all dimensions (i.e. height, width, thickness). A major benefit may be the shaping capability in the direction of the separation, i.e. what concerns the thickness of the pre-shaped sample plug. To avoid direct mixing of the pre-shaped sample film with the liquid or other carrier medium in which the pre-shaped sample film is immersed, the pre-shaped sample film can be immobilized (in particular solidified) for instance by implementing sample injection by locally generated phase transitions or any of the other approaches described herein.

Figure 1A:
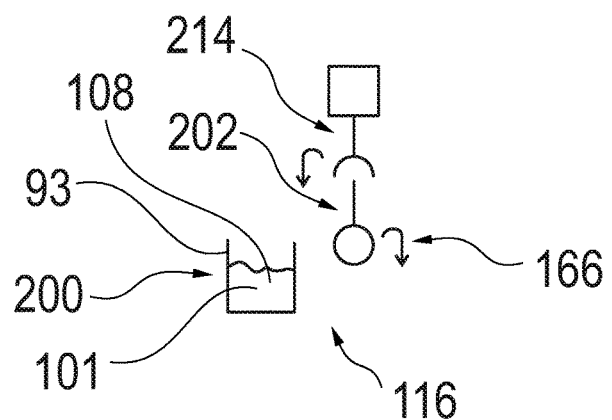
FIG. 1A shows a further portion of the liquid sample separation device of FIG. 1 illustrating handling of a sample shaping tool.

Referring now in greater detail to the drawings, FIG. 1 depicts a general schematic of a liquid separation system as example for a sample separation device 10 according to an exemplary embodiment. FIG. 1A shows a further portion of the liquid sample separation device 10 of FIG. 1 illustrating handling of a sample shaping tool 202.

A pump as fluid drive 20 receives a mobile phase from a solvent supply 25, typically via a degasser 27, which degasses and thus reduces the amount of dissolved gases in the mobile phase. The mobile phase drive or fluid drive 20 drives the mobile phase through a sample separation unit 30 (such as a chromatographic column) comprising a stationary phase. A sampler or injection unit 40, implementing a fluidic valve 95, can be provided between the fluid drive 20 and the separation unit 30 in order to subject or add (often referred to as sample introduction) a sample fluid into the mobile phase. The stationary phase of the separation unit 30 is configured for separating compounds of the sample liquid. A detector 50 is provided for detecting separated compounds of the sample fluid. A fractionating unit 60 can be provided for outputting separated compounds of sample fluid.

While the mobile phase can be comprised of one solvent only, it may also be mixed from plural solvents. Such mixing might be a low pressure mixing and provided upstream of the fluid drive 20, so that the fluid drive 20 already receives and pumps the mixed solvents as the mobile phase. Alternatively, the fluid drive 20 may be comprised of plural individual pumping units each receiving and pumping a different solvent or mixture. The composition (mixture) of the mobile phase may be kept constant over time, the so called isocratic mode, or varied over time, the so called gradient mode.

A data processing unit or control unit 70, which can be a PC or workstation, may be coupled (as indicated by the dotted arrows) to one or more of the components in the sample separation device 10 in order to receive information and/or control operation. For example, the control unit 70 may control operation of the fluid drive 20 (for example setting control parameters) and receive therefrom information regarding the actual working conditions (such as output pressure, etc., at an outlet of the pump 20). The control unit 70 may also control operation of the solvent supply 25 (for example setting the solvent/s or solvent mixture to be supplied) and/or the degasser 27 (for example setting control parameters such as vacuum level) and might receive therefrom information regarding the actual working conditions (such as solvent composition supplied over time, vacuum level, etc.). The control unit 70 might further control operation of the sampling unit or injection unit 40 (for example controlling sample injection or synchronization of sample injection with operating conditions of the fluid drive 20). The separation unit 30 might also be controlled by the control unit 70 (for example selecting a specific flow path or column, setting operation temperature, etc.), and send—in return—information (for example operating conditions) to the control unit 70. Accordingly, the detector 50 might be controlled by the control unit 70 (for example with respect to spectral or wavelength settings, setting time constants, start/stop data acquisition), and send information (for example about the detected sample compounds) to the control unit 70. The control unit 70 might also control operation of the fractionating unit 60 (for example in conjunction with data received from the detector 50), which provides data back.

As can be taken from FIG. 1A, the sample separation device 10 also comprises a schematically illustrated sample shaping tool 202 for taking fluidic sample 101 from a sample source 200 in such a way that a pre-shaped planar fluidic sample 100 is formed and held by the sample shaping tool 202. In the shown embodiment, the sample source 200 is embodied as a sample container 93 such as a vial containing a volume of fluidic sample 101. Reference numeral 166 in FIG. 1 and FIG. 1A indicates that the sample shaping tool 202, when loaded with an amount of fluidic sample 101 formed as a pre-shaped planar fluidic sample 100, may be moved to injection unit 40 for subsequent injection of the pre-shaped planar fluidic sample 100 into a separation path. For instance, the sample shaping tool 202 may be embodied as shown in FIG. 3 to FIG. 9. As illustrated schematically, the sample shaping tool 202 may be handled by a tool handling tool 214 such as a robot. Fluidic sample 101 may be intaken from the sample container 93 and held by the sample shaping tool 202 in the predefined planar shape (i.e., as the pre-shaped planar fluidic sample 100 illustrated in FIGS. 1 and 1A) by merely immersing a loop part of sample shaping tool 202 in the fluidic sample 100 in the sample container 93.

The pre-shaped planar fluidic sample 100 may be optionally but advantageously immobilized by an immobilizing agent 102 (see detail 125) inhibiting spatial broadening of the pre-shaped planar fluidic sample 100. Immobilization may be triggered when sample shaping tool 202 holding the pre-shaped planar fluidic sample 100, which may already include a first constituent 108 of the immobilization agent 102, is immersed in or is provided in another way with a second constituent 110 of the immobilizing agent 102. The immobilizing agent 102 may be configured so that, when the second constituent 110 comes into interaction with the first constituent 108 being pre-mixed with the pre-shaped planar fluidic sample 100, the pre-shaped planar fluidic sample 100 is immobilized within a shell of immobilized immobilizing agent 102, as shown in detail 125. The elements required for carrying out this immobilization are schematically indicated as immobilization unit 116 in FIG. 1 and FIG. 1A. The immobilized pre-shaped planar fluidic sample 100 may be injected from the sample shaping tool 202 via the injector 40 to a separation channel 169 for subsequent separation by the sample separation unit 30.

Alternatively, the pre-shaped planar fluidic sample 100 may be injected from the sample shaping tool 202 via the injector 40 to separation channel 169 for subsequent separation by the sample separation unit 30 without immobilization.

As already mentioned above and again referring to the embodiment involving immobilization, the immobilizing agent 102 is composed of a first constituent 108 which is pre-mixed with the fluidic sample 101 in the sample container 93, and a second constituent 110 which may be added to the pre-shaped planar fluidic sample 100 upstream of injector 40 (or alternatively in the separation channel 169). An entity providing the first constituent 108 to sample container 93 and providing the second constituent 110 to the pre-shaped planar fluidic sample 100 is denoted as immobilization unit 116. When immersing the pre-shaped planar fluidic sample 100 held by sample shaping tool 202 into second constituent 110 upstream of injector 40 (or alternatively in the separation channel 169), the constituents 108, 110 may interact and may form a solid or gel type shell of immobilizing agent 102 surrounding the pre-shaped planar fluidic sample 100, as shown in detail 125. Thus, the pre-shaped planar fluidic sample 100 is forced to remain in its planar pre-shape by the immobilized immobilizing agent 102.

In a release unit 117, the immobilized pre-shaped planar fluidic sample 100 may then be subsequently released from the immobilizing agent 102 to start a sample separation procedure. In the shown embodiment, release unit 117 is arranged in the separation channel 169 upstream of sample separation unit 30.

In view of the properly defined planar shape of the pre-shaped planar fluidic sample 100, the result of the sample separation procedure will be reliable. Moreover, when temporarily immobilizing the pre-shaped planar fluidic sample 100 in its predefined planar shape by immobilization agent 102, the conditions of sample separation may be rendered even more standardized. For instance, the pre-shaped planar fluidic sample 100 in its predefined planar shape may be immobilized for a waiting time after which actual sample separation starts. For example, a planar front of the pre-shaped planar fluidic sample 100 of predefined shape and without the tendency of spatial broadening may then be supplied to the sample separation unit 30 and may be selectively released directly prior to the actual separation procedure.

The described separation procedure may involve the need that the pre-shaped planar fluidic sample 100 supplied to injector 40 has to wait a certain waiting time before injection of the pre-shaped planar fluidic sample 100 into the flow path between the fluid drive 20 and the separation unit 30. During this waiting time, the pre-shaped planar fluidic sample 100 may spatially broaden in a conventional approach. This may result in a reduction of the resolution or separation performance of the separation process.

In order to avoid the mentioned reduction of the separation resolution or separation performance, an exemplary embodiment implements immobilization unit 116 in the sample separation device 10. In the embodiment of FIG. 1 and FIG. 1A, the immobilization unit 116 may be configured for immobilizing the pre-shaped planar fluidic sample 100 while waiting before (or after) injection by injector 40 for subsequent separation. More specifically, the immobilization unit 116 may be configured for embedding or enclosing the pre-shaped planar fluidic sample 100 by immobilizing agent 102 for inhibiting spatial broadening of the pre-shaped planar fluidic sample 100. As shown in detail 125, a cross-section of a planar sample film 104 (extending predominantly perpendicular to a paper plane of FIG. 1) may be formed with the pre-shaped planar fluidic sample 100 surrounded by a shell of immobilized (for instance gelled) immobilizing agent 102. The formation of planar sample film 104 may occur already in the sample shaping tool 202, i.e. before or at the beginning of the waiting time. The pre-shaped planar fluidic sample 100 is therefore safely protected from spatial broadening due to diffusion effects and the like during the waiting time. Descriptively speaking, the immobilized pre-shaped planar fluidic sample 100 may be shielded with regard to a fluidic medium (such as a mobile phase, i.e. a solvent or solvent composition) in an environment of the immobilizing agent 102 by immobilizing the pre-shaped planar fluidic sample 100 in a spatially confined way. In order to activate the immobilization, an immobilizing phase transition of the immobilizing agent 102 may be forced for immobilizing the pre-shaped planar fluidic sample 100. This may be done by triggering the immobilizing phase transition of the immobilizing agent 102 into a gel phase. Descriptively speaking, the pre-shaped planar fluidic sample 100 will then be surrounded by a gel shell (and/or embedded in a gel matrix) temporarily preventing or inhibiting free diffusion of the fluidic sample 100.

After injection of the planar sample film 104 by switching fluidic valve 95 into the flow path between fluid drive 20 and separation unit 30, sample separation shall be started. The mentioned flow path corresponds to separation channel 169 in which the pre-shaped planar fluidic sample 100 is to be separated. For the purpose of enabling separation of the pre-shaped planar fluidic sample 100, the pre-shaped planar fluidic sample 100 of the planar sample film 104 should be re-mobilized. This can be accomplished by release unit 117 and/or by a disintegration unit 118 which is/are here arranged in the flow path between fluid drive 20 and separation unit 30 and which is/are configured for releasing the pre-shaped planar fluidic sample 100 from the immobilizing agent 102. Additionally or alternatively, re-mobilization of the pre-shaped planar fluidic sample 100 forming part of the planar sample film 104 may also be carried out before the pre-shaped planar fluidic sample 100 is transferred into the flow path, for instance while still in the sample shaping tool 202 after expiry of the waiting time.

For instance, the disintegration unit 118 may be configured for releasing the pre-shaped planar fluidic sample 100 from the immobilized immobilizing agent 102 being previously in a gel phase by a temperature increase destroying the shell. By an appropriate temperature increase of the planar sample film 104 caused by the disintegration unit 118, the gel shell of the immobilized immobilizing agent 102 may become liquid and may thereby release the pre-shaped planar fluidic sample 100 which has been previously enclosed therein. Additionally or alternatively, disintegration of the immobilized immobilizing agent 102 may also be triggered chemically, i.e. by the addition of one or more chemicals resulting in the disintegration of the immobilized immobilizing agent 102.

Release of the pre-shaped planar fluidic sample 100 from the immobilized immobilizing agent 102 may be accomplished, additionally or alternatively, by release unit 117. For example, the release may be triggered by the release unit 117 by applying an electric release force triggering a diffusion like migration of at least part of electrically charged particles of the pre-shaped planar fluidic sample 100 through the gel shell of the immobilized immobilizing agent 102. It has turned out that the application of an electric force to the planar sample film 104 may cause charged particles of the pre-shaped planar fluidic sample 100 to move through the immobilized immobilizing agent 102 so as to be released and freed for subsequent separation independently of the immobilizing agent 102.

Concluding, the pre-shaped planar fluidic sample 100 may be handled in sample separation device 10 in such a way that it is firstly immobilized by causing a phase transition of immobilizing agent 102 into a gel phase to thereby inhibit spatial broadening of the pre-shaped planar fluidic sample 100 during a waiting time until injection is carried out and an actual separation procedure is started. Subsequently, the pre-shaped planar fluidic sample 100 is then released from the immobilizing agent 102, for instance by causing a further phase change of the latter into a liquid phase by disintegration unit 118 and/or by promoting diffusion of the pre-shaped planar fluidic sample 100 through the immobilizing agent 102 by an electric release force applied under control of release unit 117. After this release, the shown embodiment accomplishes a chromatographic separation of the released sample material of the pre-shaped planar fluidic sample 100 by chromatographic separation medium 112 (such as a stationary phase) in separation unit 30 (such as a chromatographic separation column). Briefly before and during separation, the fluidic sample material is carried within fluidic medium 106, such as a mobile phase. The fluidic sample material gets in direct contact with the fluidic medium 106 upon releasing the pre-shaped planar fluidic sample 100 from the immobilizing agent 102, see detail 127.

As indicated schematically in FIG. 1 as well, the sample separation device 10 may further comprise a compensation unit 121 (which is here embodied as part of control unit 70) configured for computationally compensating for a deviation between a separation result in the presence of the immobilizing agent 102 and a separation result in the absence of the immobilizing agent 102. More specifically, the presence of the immobilizing agent 102 may slightly influence the chemical conditions under which the sample material of the pre-shaped planar fluidic sample 100 is present. This may, in turn, have a slight influence on the separation characteristic of the sample material. In order to avoid an influence of such and other effects on the resolution or separation performance of the separation of the sample material, such effects may be taken into account and compensated for by a corrective calculation carried out by the compensation unit 121. Reference measurements, theoretical models and/or other experimental and/or historic data as well as expert knowledge may be taken into account in the framework of such a compensation procedure.

Highly advantageously, the pre-shaped planar fluidic sample 100 may be exposed on both opposing main surfaces thereof while holding the latter in a predefined shape by the sample shaping tool 202. As a consequence, introduction of the pre-shaped planar fluidic sample 100 into the fluidic medium 106 may be very simple and reliable, since the pre-shaped planar fluidic sample 100 adhering to the sample shaping tool 202 only along a circumference can be easily released from the sample shaping tool 202.

Figure 2:
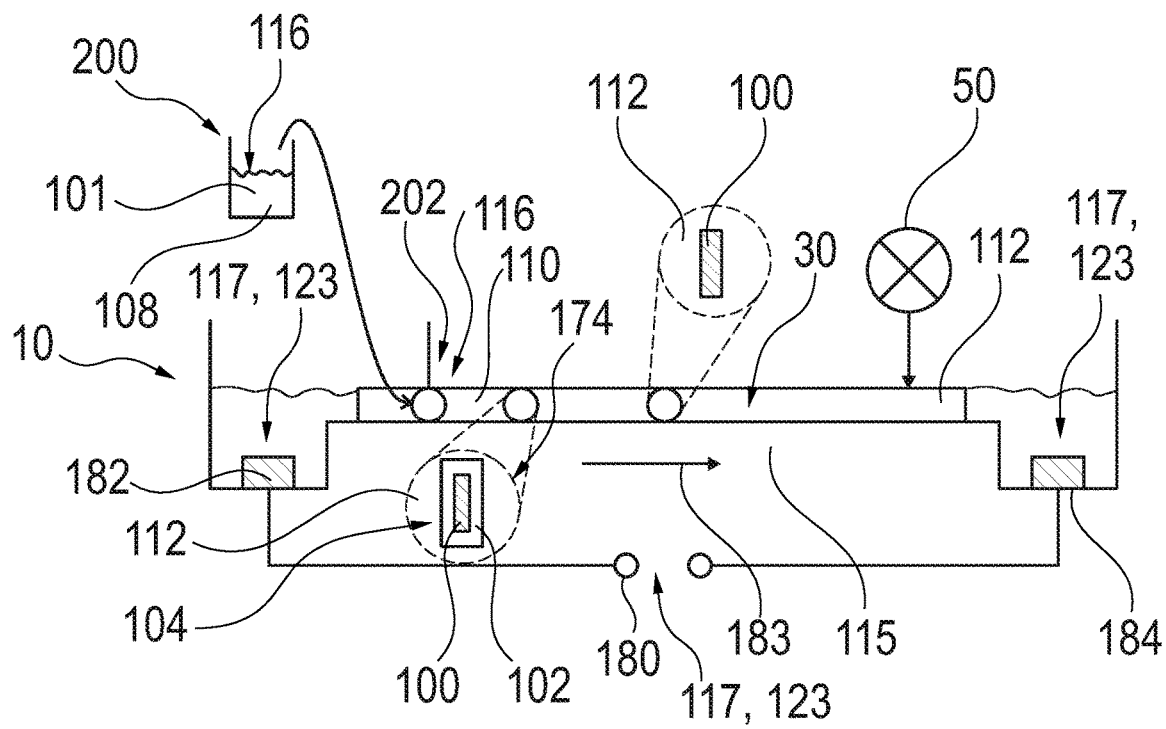
FIG. 2 shows a liquid sample separation device in accordance with another embodiment, particularly used in gel electrophoresis.

FIG. 2 shows a liquid sample separation device 10 in accordance with embodiments, particularly used in gel electrophoresis.

Before FIG. 2 is described in further detail, some further chemical details about establishing immobilization of both pre-shaped planar fluidic sample 100 and immobilizing agent 102 will be explained. In preferred embodiments, the immobilizing agent 102 comprises first constituent 108 (for instance calcium chloride) and second constituent 110 (for instance sodium alginate) which are configured so that the immobilizing agent 102 is immobilized by a contact or interaction between the first constituent 108 and the second constituent 110, since this causes an immobilizing chemical reaction between the constituents 108, 110. Such a chemical reaction may involve an ion exchange between a calcium ion of the first constituent 108 and a sodium ion of the second constituent 110 and a resulting hydrogel formation. For the purpose of simultaneously ensuring immobilization of the pre-shaped planar fluidic sample 100 when the immobilizing agent 102 is immobilized, it may be advantageous that the fluidic sample 101 is mixed with the first constituent 108 prior to the addition of the second constituent 110, so that the mixture of fluidic sample 101 and first constituent 108 may be provided already in sample source 200, see FIG. 2. This ensures that the pre-shaped planar fluidic sample 100 is in close spatial relationship with the first constituent 108 during the immobilization process. The prepared mixture of pre-shaped planar fluidic sample 100 and first constituent 108 may be applied with predefined planar shape, via sample shaping tool 202, to a carrier medium 112 (a gel used for gel electrophoresis separation in the embodiment of FIG. 2) which already comprises or is now supplied with the second constituent 110. During this application procedure, the immobilization may be instantaneously triggered as soon as the first constituent 108 (with the pre-shaped planar fluidic sample 100 mixed therewith) gets in contact with the second constituent 110 in the carrier medium 112. As a result, the immobilization reaction is spatially strictly controllable. Thus, the pre-shaped planar fluidic sample 100 is only locally immobilized by the immobilizing agent 102 while an environment of the pre-shaped planar fluidic sample 100 and of the immobilizing agent 102 remain in an unchanged state.

After the immobilizing, preparation tasks for a subsequent separation of the sample material of the pre-shaped planar fluidic sample 100 may be carried out (for instance an oil film may be applied) without running the risk that the pre-shaped planar fluidic sample 100 significantly spatially broadens during a corresponding waiting time. When the preparation is completed, release of the pre-shaped planar fluidic sample 100 from the matrix of the immobilized immobilization agent 102 can be triggered. For instance, this can be done by switching on an electric field causing charged particles of the pre-shaped planar fluidic sample 100 to diffuse through the gel type immobilizing agent 102 due to the exerted electric force generated by the electric field.

After the immobilizing, the preparing and the releasing, the method may advance by separating the re-mobilized pre-shaped planar fluidic sample 100 by the carrier (or separation) medium 112 in accordance with the principle of gel electrophoresis.

Hence, FIG. 2 shows an example of a gel electrophoresis analysis according to an exemplary embodiment. A gel is applied as electrophoretic separation or carrier medium 112 on a carrier 115. As can be taken from FIG. 2, the fluidic sample 101 provided in the sample source 200 may already be premixed with the first constituent 108 of the immobilizing agent 102. As can furthermore be taken from FIG. 2, the second constituent 110 of the immobilizing agent 102 may be inserted into the separation or carrier medium 112 (via schematically illustrated immobilizing unit 116). The immobilizing unit 116 refers to the components of the sample separation device 10 capable of triggering immobilization of the pre-shaped planar fluidic sample 100. In the shown embodiment, the immobilizing unit 116 is formed by the chemicals (first constituent 108 in sample source 200, second constituent 110 in carrier medium 112) and the mechanism providing and handling these chemicals (for instance a robot and/or control mechanism providing and handling first constituent 108 and second constituent 110) for triggering immobilization of the pre-shaped planar fluidic sample 100. After injecting the mixture of the planar pre-shaped planar fluidic sample 100 and the first constituent 108 of the immobilizing agent 102 into the separation or carrier medium 112 being provided with the second constituent 110 of the immobilizing agent 102, hydrogel formation occurs so that the pre-shaped planar fluidic sample 100 is embedded in a highly viscous hydrogel matrix which is formed by a chemical reaction between the first constituent 108 and the second constituent 110 of the immobilizing agent 102. As can be taken from detail 174 in FIG. 2, the pre-shaped planar fluidic sample 100 is immobilized in the hydrogel matrix and is therefore prevented from spatial broadening. When the actual electrophoresis experiment shall be started, the pre-shaped planar fluidic sample 100 may be freed from its hydrogel matrix to be again mobile so as to be separable according to the principle of gel electrophoresis. Freeing the pre-shaped planar fluidic sample 100 from the matrix of the immobilizing agent 102 so as to become again freely movable can be accomplished actively and/or passively.

In a passive implementation, it is possible to simply wait until the hydrogel has disintegrated or the pre-shaped planar fluidic sample 100 has diffused through the hydrogel material into the surrounding fluidic medium, i.e. separation or carrier medium 112. In an active implementation, it is possible to apply an electric field for forcing electrically charged particles of the pre-shaped planar fluidic sample 100 to move through the hydrogel under the influence of an electric release force (for instance generated by applying an electric voltage by voltage source 180 operating electrophoresis electrodes 182, 184). The electric field generated by electric field generation unit 123 (composed of voltage source 180 and electrodes 182, 184) hence generates a release force acting on the pre-shaped planar fluidic sample 100 in a planar film 104. Advantageously, the electric field generating unit 123 is configured for generating an electric field for applying an electric force to the pre-shaped planar fluidic sample 100 in carrier medium 112 during and after the releasing. The mentioned electric field causes charged particles of the pre-shaped planar fluidic sample 100 to be released or removed from the immobilized immobilizing agent 102. Advantageously, the mentioned electric field also causes released charged particles of the sample material of the pre-shaped planar fluidic sample 100 to be moved towards a detector 50 for detecting separated fractions of the fluidic sample material. In other words, the electric field generating unit 123 allows generating an electric field that performs both tasks of releasing the pre-shaped planar fluidic sample 100 from the immobilized immobilizing agent 102 and of separating the released fluidic sample material. Thus, the electric field generating unit 123 when operated as described also functions as a release unit 117 for releasing the pre-shaped planar fluidic sample 100 from the immobilized immobilizing agent 102. A motion direction of the released fluidic sample material during separation is indicated by reference numeral 183. Hence, the released fluidic sample material may then be separated into fractions of different size and charge according to the principle of electrophoresis. The individual fractions may be detected in detector 50, for instance optically.

Still referring to FIG. 2, a mix of fluidic sample material and first constituent 108 of the immobilizing agent 102 may be inserted, held in predefined shape by a loop of the sample shaping tool 202 (i.e., as the illustrated pre-shaped planar fluidic sample 100), into the gel as carrier medium 112 in terms of gel electrophoresis. Thereafter, i.e. directly after immersing the pre-shaped planar fluidic sample 100 held by the sample shaping tool 202, the pre-shaped planar fluidic sample 100 in its predefined planar shape may be immobilized by a reaction between the first constituent 108 and the second constituent 110 of the immobilizing agent 102. As a result, the pre-shaped planar fluidic sample 100 is immobilized in its predefined planar shape until an actual separation procedure shall start. Then, the pre-shaped planar fluidic sample 100 may be released from the immobilized state by a release agent added into the carrier medium 112 at an appropriate position, or—as described above—passively or under the influence of the applied electric field. A normal electrophoretic separation run may then be started, however, with a properly defined pre-shape of the pre-shaped planar fluidic sample 100.

Figure 3:
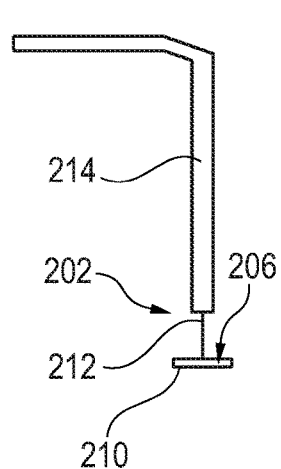
FIG. 3 schematically illustrates a sample shaping tool according to an exemplary embodiment before insertion into a sample source.
Figure 4:
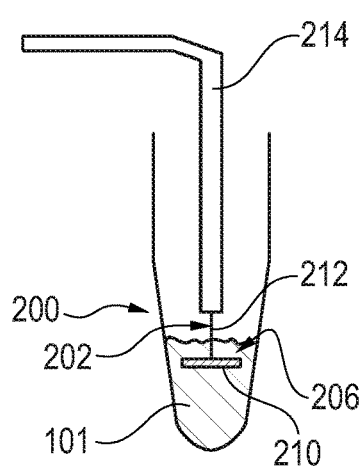
FIG. 4 shows the sample shaping tool of FIG. 3 after immersion into fluidic sample of a sample source.
Figure 5:
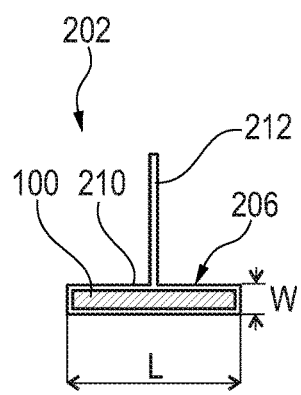
FIG. 5 shows a detailed view of part of the sample shaping tool of FIG. 3 and FIG. 4 in operation states in which the sample shaping tool holds a predefined amount of preshaped planar fluidic sample.

FIG. 3 schematically illustrates a sample shaping tool 202 according to an exemplary embodiment before inserting into a sample source 200. FIG. 4 shows the sample shaping tool 202 of FIG. 3 after immersion into fluidic sample 101 of sample source 200. FIG. 5 shows a detailed view of part of the sample shaping tool 202 of FIG. 3 and FIG. 4.

The sample shaping tool 202 illustrated in FIG. 3 to FIG. 5 comprises a sample accommodation structure 206 configured for accommodating fluidic sample 100 in a predefined planar shape when immersing the sample accommodation structure 206 in fluidic sample 101 of sample source 200. According to FIG. 5, a length L of the sample accommodation structure 206 may be in the range between 200 µm and 600 µm and a width W of the sample accommodation structure 206 may be in the range between 30 µm and 70 µm. In the shown embodiment, the sample accommodation structure 206 is configured for accommodating a predefined volume of fluidic sample material in a predefined planar shape (i.e., as the illustrated pre-shaped planar fluidic sample 100) when immersing the sample accommodation structure 206 in fluidic sample 101 in sample source 200. For this purpose, the sample accommodation structure 206 comprises a closed or mainly closed rectangular loop 210 of slightly hydrophilic or partly hydrophilic material for holding the pre-shaped planar fluidic sample 100. Moreover, the sample shaping tool 202 comprises a handle piece 212 configured for handling the sample accommodation structure 206 by a tool handling unit 214 which is here embodied as a cantilever robot arm. In order to obtain a planar film-like fluidic sample held by sample shaping tool 202, the sample accommodation structure 206 is a planar annular structure configured for pre-shaping the fluidic sample material with a planar shape when held in the sample accommodation structure 206.

FIG. 3 shows the rectangular sample accommodation structure 206 in a loop configuration connected via handle piece 212 to a tool handling unit 214 which can be configured as a moving or fixing arm. The sample accommodation structure 206 is hence configured as a plug shaping injection loop. The thin, short and tiny handle piece 212 may be configured as a small surface junction to reduce or even minimize wetting or creeping of the liquid. In other words, neither the pre-shaped planar fluidic sample 100 nor the carrier medium 106, 112 will be significantly influenced by the handle piece 212.

FIG. 4 shows how the arrangement according to FIG. 3 is immersed in sample source 200 which is here configured as a tube, for instance a tube for PCR (Polymerase Chain Reaction) applications. A certain portion of the fluidic sample 101 in the sample source 200 will be held by the loop 210 of the sample shaping tool 202 when the arrangement of FIG. 3 is again removed out of the sample source 200, as shown in FIG. 5.

FIG. 5 illustrates that a substantially two-dimensional planar sheet-like portion of fluidic sample material (i.e., as the illustrated pre-shaped planar fluidic sample 100) is held by the sample shaping tool 202 in its predefined shape.

The pre-shaped planar fluidic sample 100 held by the sample shaping tool 202 in the predefined planar shape shown in FIG. 5 may then be inserted into a carrier medium 112 for sample separation, in particular by electrophoresis.

Figure 6:
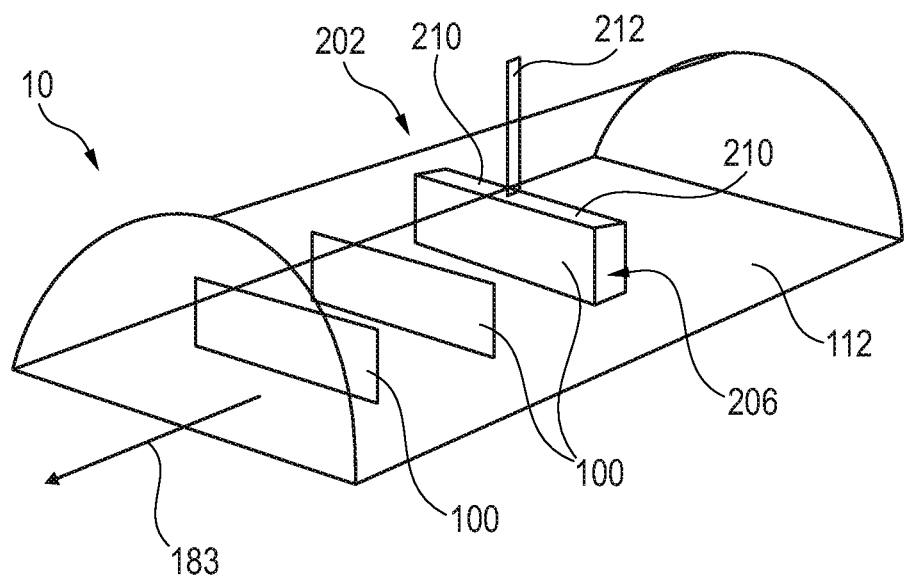
FIG. 6 illustrates part of a sample separation device according to an exemplary embodiment in which a preshaped planar fluidic sample provided by a sample shaping tool is inserted into a gel strip, applied to a planar base, defining a sample separation path.

FIG. 6 illustrates part of a sample separation device 10 according to an exemplary embodiment in which a pre-shaped planar fluidic sample 100 provided by a sample shaping tool 202 is inserted into a sample separation path and at least partially remains retains its predefined planar shape.

According to FIG. 6, the carrier medium 112 is provided in a channel-free microfluidic architecture, i.e. as a mere strip of the carrier medium 112 provided on a planar support by for instance printing. When immersing the sample shaping tool 202 with accommodated pre-shaped planar fluidic sample 100 as shown in FIG. 5 in the carrier medium 112 as shown in FIG. 6, it is optionally possible to immobilize the pre-shaped planar fluidic sample 100 with its pre-shape in the condition as shown in FIG. 6. This can be accomplished for instance by adding a first constituent 108 of an immobilizing agent 102 to the fluidic sample 100 or 101 (i.e., before or after pre-shaping), while adding a second constituent 110 of the immobilizing agent 102 to the carrier medium 112 and/or to an oil film covering the carrier medium 112 for preventing evaporation thereof (not shown). The pre-shaped planar fluidic sample 100 will then be immobilized in its planar pre-shape in the carrier medium 112. By subsequently adding a releasing agent (for instance by a pipette or droplet dispenser adding droplets of the release agent to the carrier medium 112), the pre-shaped and immobilized planar fluidic sample 100 will then be released and may propagate, under the influence of an electric field, in the form of a planar front along flow direction 183 to be separated. This is illustrated schematically in FIG. 6 as well.

Figure 7:
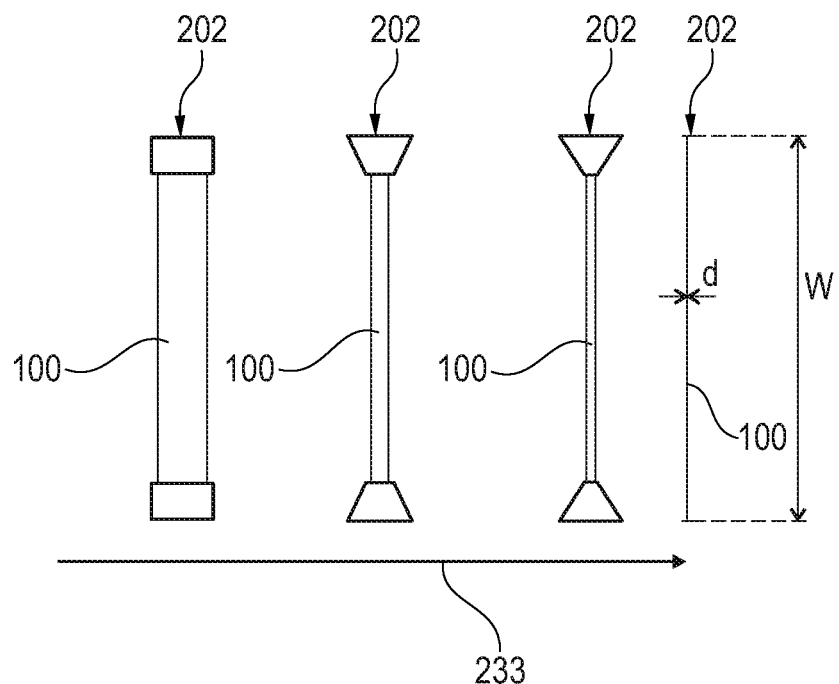
FIG. 7 illustrates planar shaping of microscopic volumes of fluidic sample by a sample shaping tool according to an exemplary embodiment.

FIG. 7 illustrates the adjustment of liquid film thickness of a pre-shaped planar fluidic sample 100 by different designs of the sample shaping tool 202 according to an exemplary embodiment.

FIG. 7 shows an axis 233 along which a plug narrowing is schematically illustrated. FIG. 7 shows that by correspondingly designing the sample shaping tool 202, the shape of the pre-shaped planar fluidic sample 100 held with the predefined shape can be properly manipulated. As shown on the right-hand side of FIG. 7, a thickness d of the pre-shaped planar fluidic sample 100 in the predefined shape can be rendered very small by correspondingly adapting the shape of the sample shaping tool 202. As shown as well, the width W can be as small as 50 μm or smaller. As illustrated in FIG. 7, the cross-sectional shape of the inner edge of the shaping tool may vary resulting in a varied thickness of the liquid film.

Figure 8A:
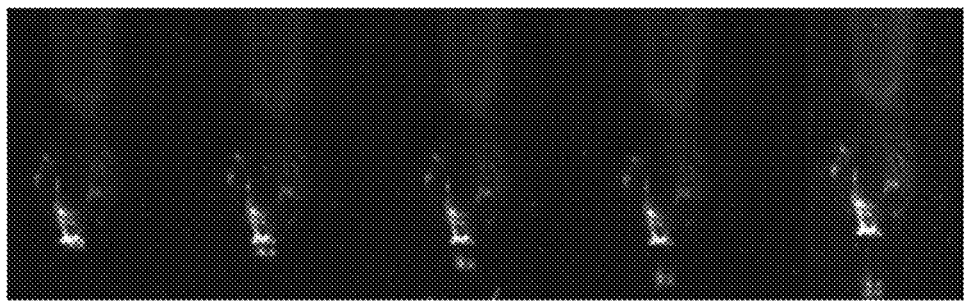
FIG. 8A illustrates an experimental setup showing how fluidic sample held by a sample shaping tool, illustrated in FIG. 8B, with two separate sample accommodation volumes is subsequently separated by gel electrophoresis.
Figure 8B:
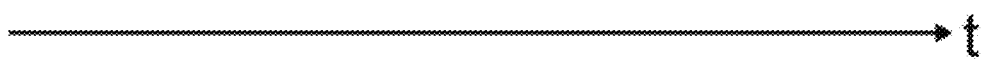

FIG. 8A shows an experimental setup of separating a fluidic sample according to an exemplary embodiment. FIG. 8B shows a correspondingly used sample shaping tool 202 according to an exemplary embodiment having two sample accommodation structures 206 each for accommodating a respective pre-shaped planar fluidic sample 100. Referring to the shown experimental data, the pre-shaped planar fluidic sample 100 in the two sample accommodation structures 206 has been immobilized by an alginate-calcium chloride immobilization reaction. Subsequently, the immobilized pre-shaped planar fluidic sample 100 has been released, so that two separate elements of pre-shaped planar fluidic sample 100 begin to move under the influence of the electric field (see image in the middle and penultimate image from the right-hand side). Furthermore, each of the fluidic samples 100 is then separated into fractions, as can be seen in the image on the right-hand side of FIG. 8A. The time flow of the described experiment is indicated schematically by a time axis labelled "t" in FIG. 8A.

As can be taken from FIG. 8B, it is also possible to form a sample shaping tool 202 with multi chambers, for instance two or more chambers or sample accommodation structures 206. The same fluidic sample or different fluidic samples may be accommodated in the different sample accommodation structures 206 of such a multi chamber sample shaping tool 202.

Figure 9:
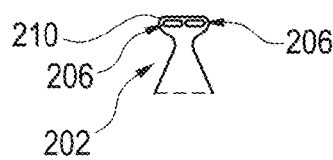
FIG. 9 shows a detailed view of a sample shaping tool formed by laser processing of a plastic foil.
Figure 9:
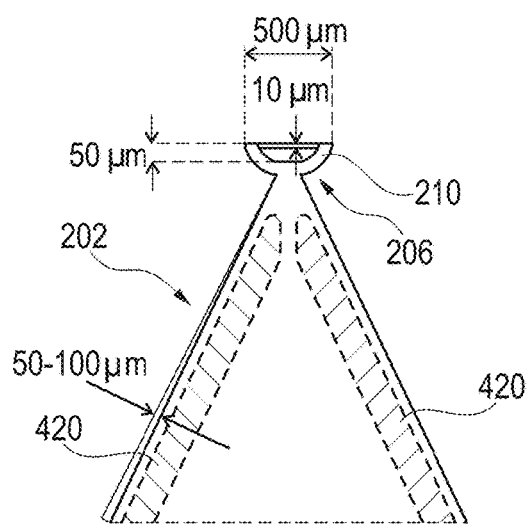

FIG. 9 shows a sample shaping tool 202 according to an exemplary embodiment which is formed by laser processing of a polyimide or polyamide foil having a thickness of for instance 50 μm to 100 μm. It is shown in FIG. 9 that very tiny dimensions can be achieved. The sample shaping tool 202 according to FIG. 9 is sufficiently robust for the intended use and is nevertheless able to hold a thin planar film of pre-shaped planar fluidic sample 100 for subsequent separation by gel electrophoresis. Laser processing of a foil in particular allows an advantageous adaptation of the injection volume. According to FIG. 9, the shape of the sample accommodation structure 206 delimited by the loop 210 of the sample shaping tool 202 is a circular segment corresponding to the cross-sectional shape of the gel having a circular segment-like cross section as well (compare for instance FIG. 6). Furthermore, it is possible that the sample shaping tool 202 is provided with functional structures such as electrodes 420.

Figure 10:
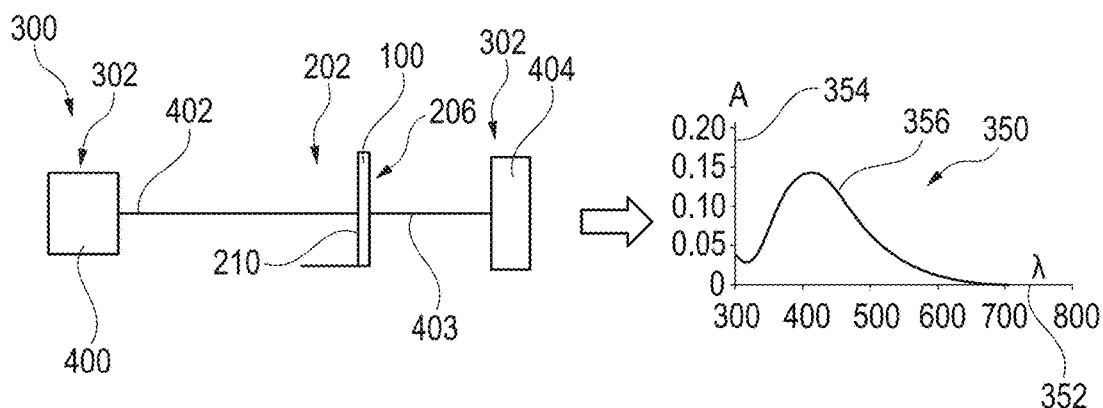
FIG. 10 illustrates a sample handling device during carrying out an optical measurement with planar fluidic sample held by a sample shaping tool according to an exemplary embodiment.

Referring to FIG. 10, a sample handling device 300 according to an exemplary embodiment is shown. The sample handling device 300 generally includes a sample processing unit 302. In the illustrated embodiment, a light source 400 emits a primary light beam 402 onto the pre-shaped planar fluidic sample 100 held in the sample shaping tool 202. A detector 404 detects secondary light 403 transmitted from the pre-shaped planar fluidic sample 100. In an embodiment, the sample handling device 300 is configured as a sample separation device 10 for separating the sample material of the pre-shaped planar fluidic sample 100. In such embodiment, the sample processing unit 302 may include a sample separation unit 30 configured for separating the pre-shaped planar fluidic sample 100 when supplied to the sample separation unit 30.

A diagram 350 has an abscissa 352 along which the wavelength A is plotted. Along an ordinate 354, the absorbance A is plotted, see curve 356.

As shown in FIG. 10, the sample handling device 300 can be used as an optical cell, for instance as a cuvette for a spectrophotometer. The thickness of the film of pre-shaped planar fluidic sample 100 is well-defined. No other material needs to be in the optical path so that substantially no additional background is advantageously added.

Figure 11:
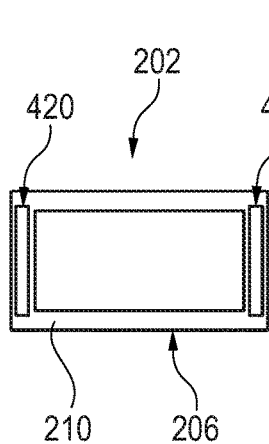
FIG. 11 shows a sample shaping tool with electrodes as functional structures for manipulating a held planar fluidic sample according to an exemplary embodiment.

As shown in FIG. 11, the sample shaping tool 202 may be configured as an active device by providing electrodes 420 or traces for supplying electric signals, applying electric fields, applying magnetic fields, etc. The electrodes 420 may also be used for separation purposes and/or for detection purposes and/or as sensors.

When equipping the sample shaping tool 202 with one or more electrodes 420, as shown in the sample shaping tool 202 illustrated in FIG. 11, the functionality of the sample shaping tool 202 may be further improved. Such electrodes 420 may for instance be printed, sputtered, etc. on the edges of the loop-shaped sample shaping tool 202. Complementary measurements to other applications like electrophoresis are thus possible. It is also possible to use the electrodes 420 as a sensor to analyze small volumes. For instance, it is possible to measure capacitance, impedance, or conductivity across the liquid film in the loop 210. Moreover, the shown embodiment is also advantageous in terms of sample preparation or sample manipulation. For instance, a pre-concentration in the loop center or at the loop edges may be achieved by this (in particular by stacking). Further, a sample-denaturing step may be conducted, either by electric heating or due to the electric field. Also, such an embodiment can be used for gas chromatography (GC) sample injection. In this context, sample vaporization may be carried out by electric loop heating, which can be achieved via the electrodes 420 as well.

Figure 12:
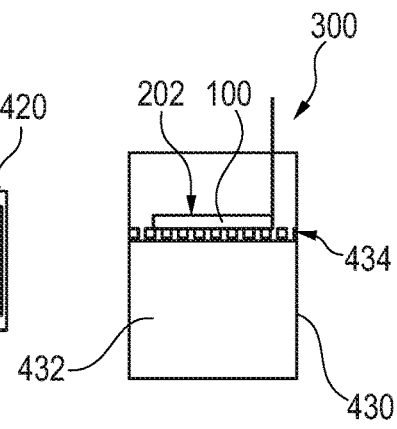
FIG. 12 shows a sample handling device according to another exemplary embodiment by which planar fluidic sample held by a sample shaping tool is dialyzed.

FIG. 12 shows a sample handling device 300 according to yet another exemplary embodiment. In this embodiment, a dialysis medium container 430 is provided which is filled with a dialysis medium 432 such as a dialysis buffer. The dialysis medium 432 may be covered with a (for instance semi-)permeable membrane 434. When the sample shaping tool 202 with the held pre-shaped planar fluidic sample 100 is brought in interaction with the dialysis membrane 434, the pre-shaped planar fluidic sample 100 can be dialyzed within the sample shaping tool 202.

When the sample handling device 300 is used for dialyzing the pre-shaped planar fluidic sample 100 held by the sample shaping tool 202, it may also be possible in another embodiment to omit the dialysis membrane 434 when the pre-shaped planar fluidic sample 100 held by the sample shaping tool 202 is in an immobilized shape. The immobilizing agent 102 may then function as a substitute of dialysis membrane 434.

Figure 13:
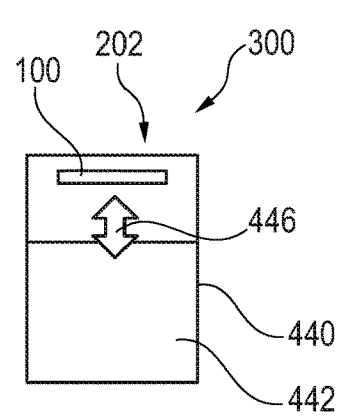
FIG. 13 shows a sample handling device according to another exemplary embodiment in which a planar fluidic sample held by a sample shaping tool is made subject to protein crystallization.

As shown in the sample handling device 300 according to FIG. 13, it is also possible to provide a crystallization medium container 440 containing a crystallization medium 442 such as a crystallization buffer. When the pre-shaped planar fluidic sample 100 held by the sample shaping tool 202 is brought in interaction (see double arrow 446) with the crystallization medium 442, crystallization of protein molecules of the pre-shaped planar fluidic sample 100 may be triggered for creating protein crystals. The protein crystals may then be analyzed directly within the sample shaping tool 202, for instance in terms of an X-ray analysis for determination of the protein structure.

Figure 14:
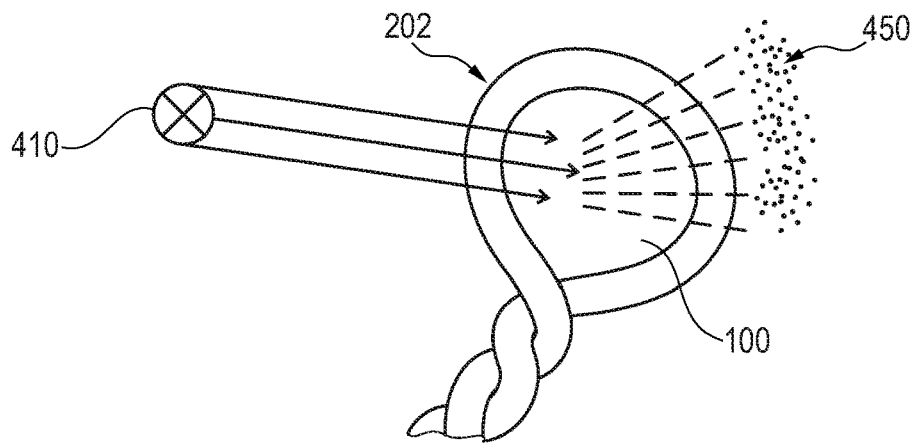
FIG. 14 shows part of a sample handling device according to yet another exemplary embodiment in which a fluidic sample held by a sample shaping tool is irradiated with a high power laser beam for generating an ionic sample.

As shown in FIG. 14, a laser beam generated by a laser source functioning as ionizing unit 410 may be shot onto the sample shaping tool 202 holding the pre-shaped planar fluidic sample 100 as a thin film. Due to the liquid film fixation, the pre-shaped planar fluidic sample 100 or part thereof may be transferred into ionized sample 450 which can be analyzed by mass spectrometry (such as MALDI-MS).

Figure 15:
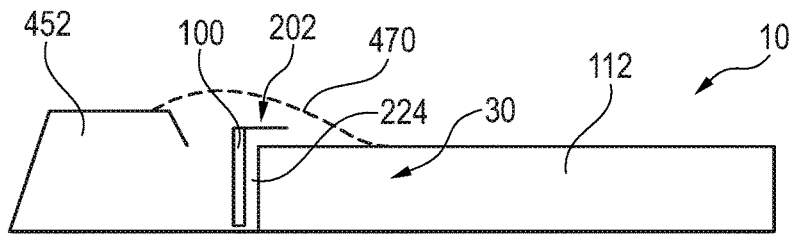
FIG. 15 shows a sample separation device according to another exemplary embodiment in which a planar sample held by a sample shaping tool is inserted into a recess for supplying the planar fluidic sample to a separation gel.
Figure 16:
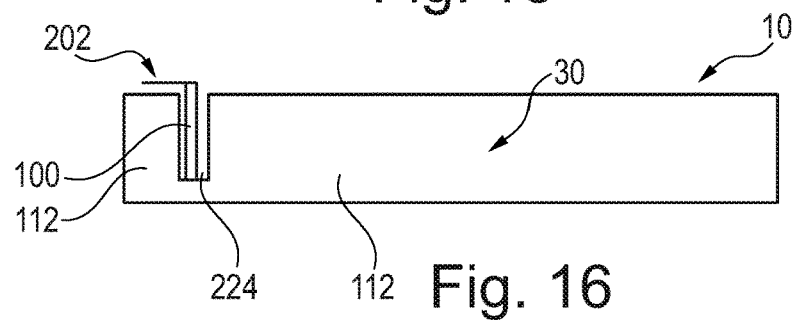
FIG. 16 shows a sample separation device according to yet another exemplary embodiment in which a separation gel is provided with a recess for inserting a sample shaping tool holding a planar fluidic sample to be separated by gel electrophoresis.

As shown by the sample handling devices being configured as sample separation devices 10 according to FIG. 15 and FIG. 16, it is also possible to use a sample shaping tool 202 holding a pre-shaped planar fluidic sample 100 for a ScreenTape as provided by the applicant Agilent Technologies or a slab gel injector. A ScreenTape injector is shown in FIG. 15, and a slab gel injector is shown in FIG. 16.

Referring to FIG. 15, a removable seal (indicated schematically in FIG. 15 by reference numeral 470) may be added to the ScreenTape design. The seal 470 may be removed to introduce the loop-shaped sample shaping tool 202 in a recess 224. A buffer solution may be provided in volume 452.

As shown in FIG. 16, a gel pocket may be formed as recess 224 for inserting the sample shaping tool 202 for bringing the held pre-shaped planar fluidic sample 100 in interaction with a separation gel.

Figure 17:
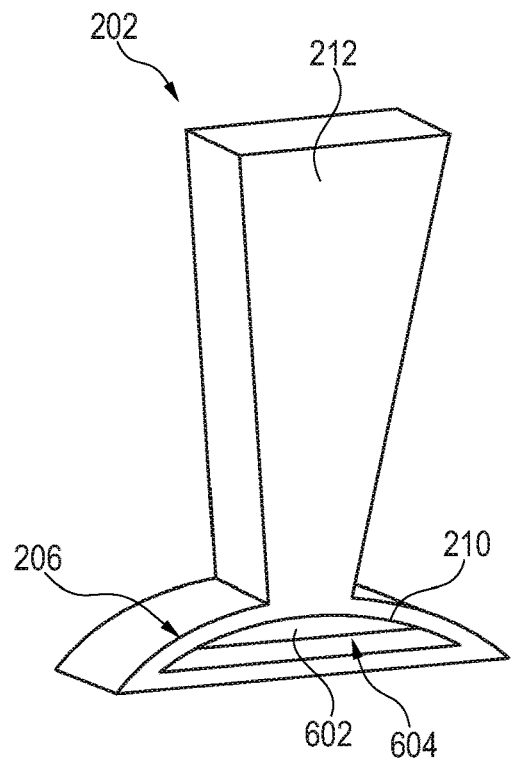
FIG. 17 shows a three-dimensional view of a sample shaping tool according to another exemplary embodiment.

FIG. 17 shows a three-dimensional view of a sample shaping tool 202 according to another exemplary embodiment.

According to the embodiment of FIG. 17, the sample shaping tool 202 is configured so that the sample accommodation structure 206 defines a recess 604. Such a recess 604 can be a blind hole rather than a through hole. In the shown embodiment, the recess 604 is delimited circumferentially by a loop 210 and by a back wall 602 connected to the loop 210 and defining a bottom of the recess 604. In the shown embodiment, a pre-shaped planar fluidic sample 100 accommodated in the sample accommodation structure 206 has only one free or exposed main surface, wherein an opposing other main surface of the held pre-shaped planar fluidic sample 100 contacts the back wall 602 of the recess 604. More specifically, FIG. 17 shows a sample shaping tool 202 which has recess 604 where the pre-shaped planar fluidic sample 100 also sticks to. Additionally, the sample shaping tool 202 may be itself an electrode. In this case, there is a starting point at the sample shaping tool 202 towards an opposite electrode.

Figure 18:
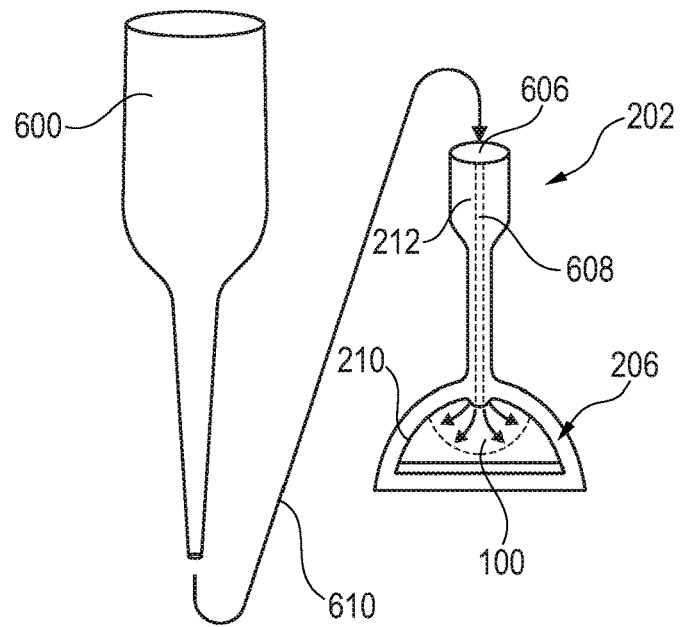
FIG. 18 shows a pipette together with a three-dimensional view of a sample shaping tool according to still another exemplary embodiment.

FIG. 18 shows a pipette 600 together with a three-dimensional view of a sample shaping tool 202 according to still another exemplary embodiment.

In the embodiment of FIG. 18, fluidic sample 101 is introduced into the sample shaping tool 202 using a pipette 600. As indicated schematically by reference numeral 610, fluidic sample 101 in the pipette 600 may be transferred via a pipette tip into fluidic interface 606 of sample shaping tool 202. Within the handle piece 212 (or at another appropriate position) of the sample shaping tool 202, a conduit 608 is formed which is in fluid communication with the sample accommodation structure 206 for guiding fluidic sample 101 from the pipette 600 via the fluidic interface 606 (which may also be denoted as a pipette interface), through the conduit 608 and into the sample accommodation structure 206. This renders sample introduction particularly simple. Thus, FIG. 18 shows a sample shaping tool 202 with a loop-like structure fluidically connected with conduit 608 (such as a capillary or tubing) provided with the fluidic interface 606 for the pipette tip (or another sample delivery device) in order to prime the sample shaping tool 202.

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

The invention claimed is:

1. A method of handling a fluidic sample, the method comprising:
   taking fluidic sample from a sample source by a sample shaping tool so that a pre-shaped planar fluidic sample is held by the sample shaping tool with at least one main surface of the pre-shaped planar fluidic sample being exposed, wherein the sample shaping tool comprises a loop configured to hold the fluidic sample in a predefined planar shape defined by the loop;
   at least partially immobilizing the pre-shaped planar fluidic sample by triggering an immobilizing phase transition of an immobilizing agent inhibiting spatial broadening of the pre-shaped planar fluidic sample; and
   after the at least partially immobilizing, processing the pre-shaped planar fluidic sample.

2. The method according to claim 1, wherein processing the pre-shaped planar fluidic sample comprises supplying the pre-shaped planar fluidic sample from the sample shaping tool for separation of the fluidic sample in a sample separation device.

3. The method according to claim 1, comprising supplying the pre-shaped planar fluidic sample for separation along a separation path so that a normal vector of the main surface of the planar fluidic sample corresponds to a motion direction of the fluidic sample during the separation.

4. The method according to claim 2, wherein supplying the pre-shaped planar fluidic sample comprises immersing the sample shaping tool with the pre-shaped planar fluidic sample into a carrier medium in which the fluidic sample is subsequently separated.

5. The method according to claim 4, comprising keeping the sample shaping tool immersed in the carrier medium during separation of the fluidic sample.

6. The method according to claim 1, comprising subsequently at least partially releasing the pre-shaped planar fluidic sample from the immobilizing agent, wherein the processing the pre-shaped planar fluidic sample is done after the releasing.

7. The method according to claim 6, comprising at least one of the following features:
   wherein the immobilizing agent is a porous medium;
   wherein the method comprises triggering the releasing by applying a release force triggering migration of at least part of the fluidic sample out of the immobilized immobilizing agent;
   wherein the method comprises triggering the releasing by applying an electric release force triggering migration of at least part of the fluidic sample out of the immobilized immobilizing agent;
   wherein the method comprises triggering the releasing by at least partly disintegrating the immobilizing agent;
   wherein the method comprises triggering the releasing by at least partly disintegrating the immobilizing agent by a mechanism selected from the group consisting of: thermally; electrically;

chemically; by magnetic forces; and by exposing the pre-shaped planar fluidic sample to electromagnetic radiation;

wherein the method comprises at least partly releasing the fluidic sample from the immobilizing agent by waiting for a spontaneous disintegration of the immobilizing agent;

wherein the method comprises triggering the releasing by triggering a disintegrating phase change of the immobilizing agent for at least partially disintegrating the immobilizing agent.

8. The method according to claim 1, comprising at least one of the following features:

wherein the method comprises shielding the at least partially immobilized fluidic sample with regard to a carrier medium in an environment of the immobilizing agent;

wherein the method comprises shielding the at least partially immobilized fluidic sample with regard to a carrier medium in an environment of the immobilizing agent, and further comprising contacting the fluidic sample with the carrier medium by at least partially releasing the fluidic sample from the immobilizing agent.

9. The method according to claim 1, wherein the immobilizing agent comprises a first constituent and a second constituent configured so that the immobilizing agent is at least partially immobilized by an interaction between the first constituent and the second constituent.

10. The method according to claim 9, comprising at least one of the following features:

wherein the method comprises providing the fluidic sample with the first constituent before or during accommodating the fluidic sample in the sample shaping tool, and thereafter supplying the second constituent to the fluidic sample while the fluidic sample is held by the sample shaping tool before or during supplying the fluidic sample from the sample shaping tool for the processing;

wherein the interaction triggering the at least partially immobilizing is an ion exchange between the first constituent and the second constituent;

wherein the interaction triggering the at least partially immobilizing is a hydrogel formation with participation of the first constituent and the second constituent;

wherein the first constituent is thrombin and the second constituent is fibrinogen;

wherein the first constituent is fibrinogen and the second constituent is thrombin;

wherein the first constituent is a polymerizable substance and the second constituent is a polymerization-triggering agent;

wherein the first constituent is a polymerization-triggering agent and the second constituent is a polymerizable substance;

wherein the method comprises triggering the at least partially immobilizing by mixing the fluidic sample with the first constituent, and subsequently supplying the mixture into a carrier medium comprising the second constituent, and the carrier medium comprises one selected from the group consisting of: a gel; an electrophoresis gel; a mobile phase; and a chromatographic mobile phase.

11. The method according to claim 1, wherein at least partially immobilizing the pre-shaped planar fluidic sample is done before or during supplying the fluidic sample to a carrier medium for subsequent processing of the fluidic sample.

12. The method according claim 1, wherein the at least partially immobilizing comprises embedding at least part of the fluidic sample in the immobilizing agent and/or enclosing at least part of the fluidic sample by the immobilizing agent.

13. The method according to claim 1, comprising providing the immobilizing agent or a constituent thereof as a flowable medium prior to the at least partially immobilizing.

14. A sample handling device for handling a fluidic sample, the sample handling device comprising:

a sample shaping tool configured to take fluidic sample from a sample source so that a pre-shaped planar fluidic sample is held by the sample shaping tool with at least one main surface of the pre-shaped planar fluidic sample being exposed, wherein the sample shaping tool comprises a loop configured to hold the fluidic sample in a predefined planar shape defined by the loop;

a sample processing unit configured to process the pre-shaped planar fluidic sample when supplied to the sample processing unit; and an immobilization unit configured to at least partially immobilize the pre-shaped planar fluidic sample by triggering an immobilizing phase transition of an immobilizing agent inhibiting spatial broadening of the pre-shaped planar fluidic sample before or during supplying the pre-shaped planar fluidic sample to the sample processing unit.

15. The sample handling device according to claim 14, configured as a sample separation device for separating the fluidic sample, wherein the sample processing unit comprises a sample separation unit configured to separate the pre-shaped planar fluidic sample when supplied to the sample separation unit.

16. The sample handling device according to claim 14, comprising a release unit configured to at least partially release the fluidic sample from the immobilizing agent.

17. The sample handling device according to claim 16, comprising at least one of the following features:

wherein the release unit is configured to at least partially release the fluidic sample from the immobilizing agent by applying an electric field;

comprising a disintegration unit configured for triggering an at least partial disintegration of the immobilizing agent after the at least partially immobilizing to thereby release the fluidic sample;

comprising a fluid drive configured for driving the fluidic sample in a mobile phase after the releasing towards the sample separation unit;

comprising an electric field generating unit configured for generating an electric field for applying an electric force to the fluidic sample in a carrier medium during and/or after the at least partially releasing, for at least partially releasing the fluidic sample from the immobilized immobilizing agent and/or for separating and moving the fluidic sample towards a detector for detecting separated fractions of the fluidic sample.

18. The sample handling device according to claim 14, comprising at least one of the following features:

wherein a carrier medium with which the fluidic sample interacts during sample separation is provided with a recess configured for inserting the sample shaping tool with the pre-shaped planar fluidic sample into the recess to thereby bring the fluidic sample into interaction with the carrier medium;

an injection unit configured to inject the at least partially immobilized fluidic sample into a separation channel in which the fluidic sample is to be separated;

an injection unit configured to inject the at least partially immobilized fluidic sample into a separation channel for guiding the fluidic sample to the sample separation unit;

a compensation unit configured to at least partially compensate for a deviation between a separation result in the presence of the immobilizing agent and a separation result in the absence of the immobilizing agent.

19. A sample handling device for handling a fluidic sample, the sample handling device comprising:

a sample shaping device comprising: a sample accommodation structure configured to accommodate a fluidic sample, the sample accommodation structure comprising a loop configured to hold the fluidic sample in a predefined planar shape defined by the loop and with at least one main surface of the planar fluidic sample being exposed when immersing the sample accommodation structure in the fluidic sample from a sample source, wherein a length (L) and a width (W) of the sample accommodation structure are both less than 5 mm;

a sample processing unit configured to process the pre-shaped planar fluidic sample when supplied to the sample processing unit; and an immobilization unit configured to at least partially immobilize the pre-shaped planar fluidic sample by triggering an immobilizing phase transition of an immobilizing agent inhibiting spatial broadening of the pre-shaped planar fluidic sample before or during supplying the pre-shaped planar fluidic sample to the sample processing unit.

20. The sample handling device of claim 19, comprising at least one of the following features:

wherein the loop comprises at least one selected from the group consisting of: a closed loop; an open loop; a round loop; a circular loop; a polygonal loop; a rectangular loop; and a square loop;

comprising at least one further sample accommodation structure configured to accommodate further fluidic sample in a predefined planar shape when immersing the at least one further sample accommodation structure in the fluidic sample from the sample source;

wherein the sample accommodation structure comprises a foil;

comprising a functional structure configured to functionally influence the fluidic sample accommodated in the sample accommodation structure;

comprising a functional structure configured to functionally measure the fluidic sample accommodated in the sample accommodation structure;

comprising at least one electrode configured to measure an attribute of the fluidic sample accommodated in the sample accommodation structure, wherein the attribute is at least one selected from the group consisting of: capacitance; impedance; and conductivity;

wherein at least part of the sample accommodation structure comprises a non-hydrophobic material;

comprising a handle piece configured for handling the sample accommodation structure manually by a user;

comprising a handle piece configured for handling the sample accommodation structure automatically by a tool handling unit;

wherein the sample accommodation structure is a planar structure configured for pre-shaping the fluidic sample with a planar shape when held by the sample accommodation structure;

wherein the length (L) of the sample accommodation structure is in a range selected from the group consisting of: a range between 100 μm and 700 μm; and a range between 200 μm and 500 μm;

wherein the width (W) of the sample accommodation structure is in a range selected from the group consisting of: a range between 10 μm and 100 μm; and a range between 30 μm and 70 μm;

wherein the sample shaping tool is configured so that the sample accommodation structure defines a recess;

wherein the sample shaping tool is configured so that the sample accommodation structure defines a recess delimited by a back wall connected to the loop;

wherein the sample shaping tool comprises a porous material;

wherein the sample shaping tool comprises a conduit in fluid communication with the sample accommodation structure for guiding fluidic sample from a fluidic interface through the conduit after the sample accommodation structure.

* * * * *